US012659010B2

(12) United States Patent　　(10) Patent No.:　US 12,659,010 B2
Harada et al.　　(45) Date of Patent:　　Jun. 16, 2026

(54) COMMUNICATION APPARATUS, BASE STATION, AND COMMUNICATION METHOD

(71) Applicant: DENSO CORPORATION, Kariya-city (JP)

(72) Inventors: Misa Harada, Nisshin-city (JP);
Hideaki Takahashi, Kariya-city (JP);
Takafumi Nishi, Nisshin-city (JP);
Hideo Himeno, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 244 days.

(21) Appl. No.: 18/396,448

(22) Filed: Dec. 26, 2023

(65) Prior Publication Data

US 2024/0129015 A1　　Apr. 18, 2024

Related U.S. Application Data

(63) Continuation of application No. PCT/JP2022/025394, filed on Jun. 24, 2022.

(30) Foreign Application Priority Data

Jun. 28, 2021　(JP) ................................ 2021-106434

(51) Int. Cl.
　*H04B 7/06*　　　(2006.01)
　*H04L 1/1812*　　(2023.01)
　　　　(Continued)

(52) U.S. Cl.
　CPC ....... *H04B 7/06964* (2023.05); *H04L 1/1812* (2013.01); *H04W 24/08* (2013.01); *H04W 76/20* (2018.02)

(58) Field of Classification Search
　CPC .. H04B 7/06964; H04L 1/1812; H04W 24/08;
　　　　　H04W 72/21; H04W 76/15; H04W 76/19;
　　　　　　　　　　　　　　　　　H04W 76/20
　See application file for complete search history.

(56) References Cited

U.S. PATENT DOCUMENTS 12,232,125　B2　　2/2025　Yan et al.
2020/0314816　A1　10/2020　Yi et al.
(Continued)

FOREIGN PATENT DOCUMENTS

WO　　　2020143692　A1　　7/2020
WO　　　2021/034672　A1　　2/2021
WO　　WO-2022031089　A1　　2/2022

OTHER PUBLICATIONS

RP-202024, Revised WID: Further enhancements on MIMO for NR, 3GPP TSG RAN Meeting #89e, Electronic Meeting, Sep. 14-18, 2020, pp. 1-5.

(Continued)

*Primary Examiner* — Thomas R Cairns
*Assistant Examiner* — Kai Chang
(74) *Attorney, Agent, or Firm* — Harness, Dickey & Pierce, P.L.C.

(57)　　　　ABSTRACT

A user equipment (UE) performs radio communication with a base station that manages a cell including N (N≥2) transmission/reception points. The UE comprises: a communicator configured to receive a radio resource control (RRC) message from the base station, the RRC message including information for configuring N beam failure detection resource sets; and a controller configured to individually detect beam failure for each of the N beam failure detection resource sets. The controller is configured to trigger beam failure recovery (BFR) for one beam failure detection resource set with which the beam failure has been detected. The communicator is configured to cancel all the triggered (Continued)

BFRs for the one beam failure detection resource set in a case where a MAC PDU is transmitted, the MAC PDU including a BFR MAC CE including information regarding the detected beam failure.

10 Claims, 24 Drawing Sheets

(51) Int. Cl.
     H04W 24/08          (2009.01)
     H04W 76/20          (2018.01)

(56)                    References Cited

U.S. PATENT DOCUMENTS

| | | | | |
|---|---|---|---|---|
| 2021/0021329 | A1 | 1/2021 | Zhang et al. | |
| 2021/0028849 | A1 | 1/2021 | Chin et al. | |
| 2021/0307108 | A1* | 9/2021 | Babaei | H04W 76/18 |
| 2021/0329677 | A1* | 10/2021 | Huang | H04W 52/0206 |
| 2022/0103419 | A1* | 3/2022 | Zhou | H04L 41/0654 |
| 2022/0109547 | A1* | 4/2022 | Svedman | H04W 76/19 |
| 2022/0322325 | A1* | 10/2022 | Svedman | H04W 36/00 |
| 2023/0353223 | A1* | 11/2023 | Jia | H04B 7/06954 |
| 2024/0007879 | A1* | 1/2024 | Liu | H04W 24/04 |
| 2024/0129007 | A1* | 4/2024 | Zhu | H04B 7/0619 |

OTHER PUBLICATIONS

RP-202803, Summary for WI: Enhancement on MIMO for NR, 3GPP TSG RAN Meeting #90-e, Electronic Meeting, Dec. 7-11, 2020, pp. 1-10.
R2-2105870, Beam failure with mTRP, 3GPP TSG-RAN WG2 Meeting #114 Electronic, Elbonia, May 19-27, 2021, pp. 1-4.
R2-2105341, Discussion on RAN2 specification impacts of TRP-based BFR, 3GPP TSG-RAN WG2 Meeting #114 electronic, Online, May 2021, pp. 1-3.
3GPP TS38.213 v16.5.0, (Mar. 2021), 3rd Generation Partnership Project; Technical Specification Group Radio Access Network; NR; Physical layer procedures for control, (Release 16), pp. 1-183.
3GPP TS38.321 v16.4.0, (Mar. 2021), 3rd Generation Partnership Project; Technical Specification Group Radio Access Network; NR; Medium Access Control (MAC) protocol specification, (Release 16), pp. 1-157.
3GPP TS38.331 v16.4.1, (Mar. 2021), 3rd Generation Partnership Project; Technical Specification Group Radio Access Network; NR; Radio Resource Control (RRC) protocol specification, (Release 16), pp. 1-949.
R2-2010805, 3GPP TSG-RAN WG2 Meeting #112-e, Online, Nov. 2-13, 2020, pp. 1-6.
Notice of Reasons for Refusal regarding Japanese Patent Application No. 2021-106434, dated Feb. 25, 2025. Translation provided by Ozawa IP Firm.

* cited by examiner

Figure 2:
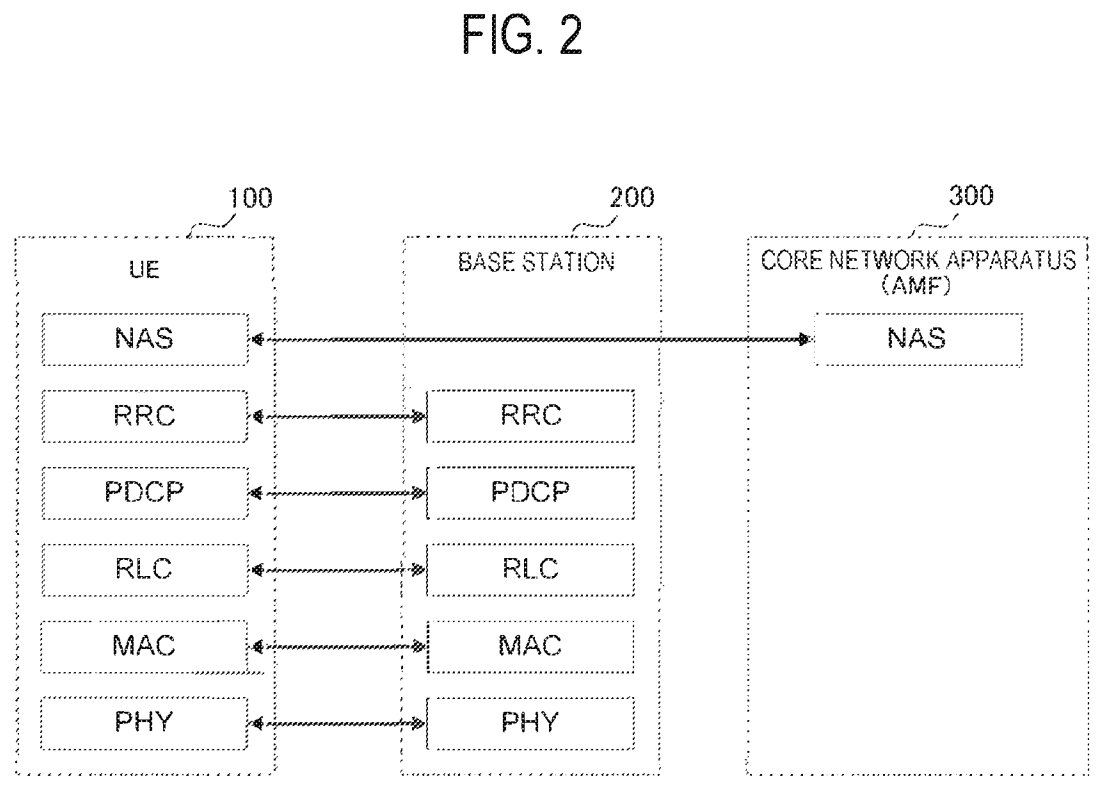

Figure 3:
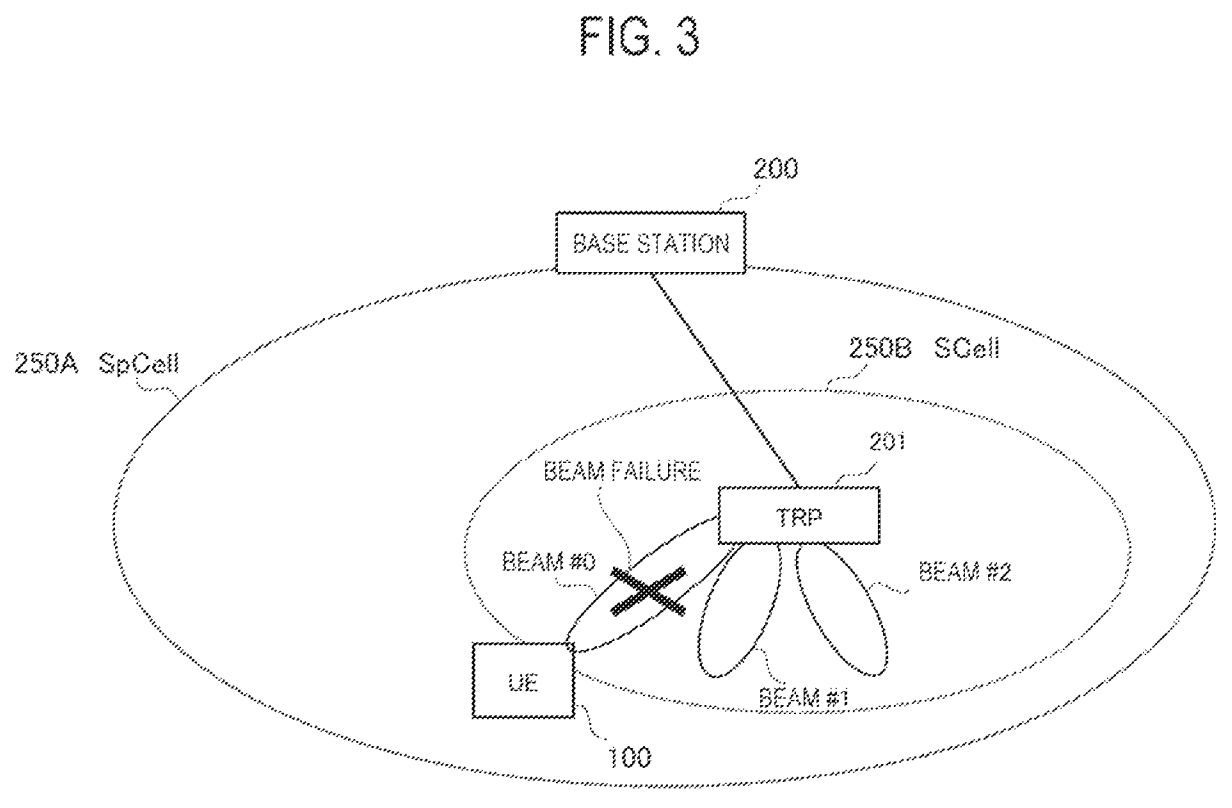

Figure 4:
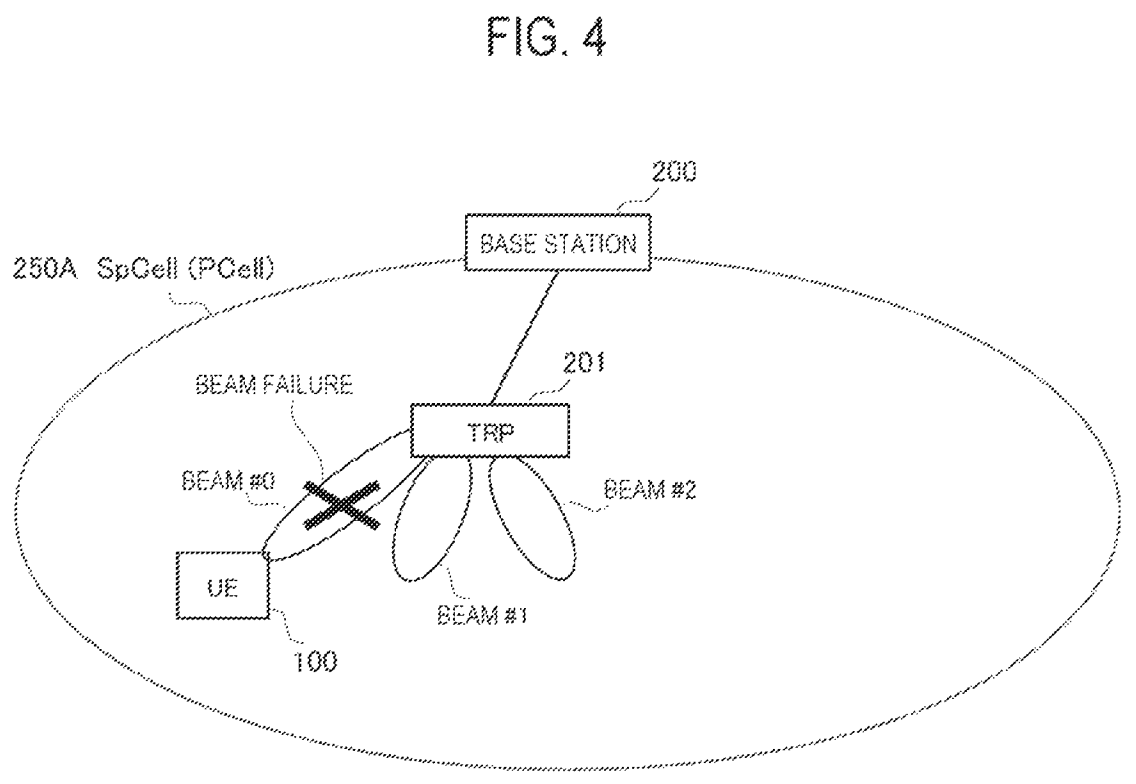

250A  SpCell (PCell)

200

BASE STATION

201

TRP

BEAM #2

BEAM #1

BEAM FAILURE

BEAM #0

Figure 6:
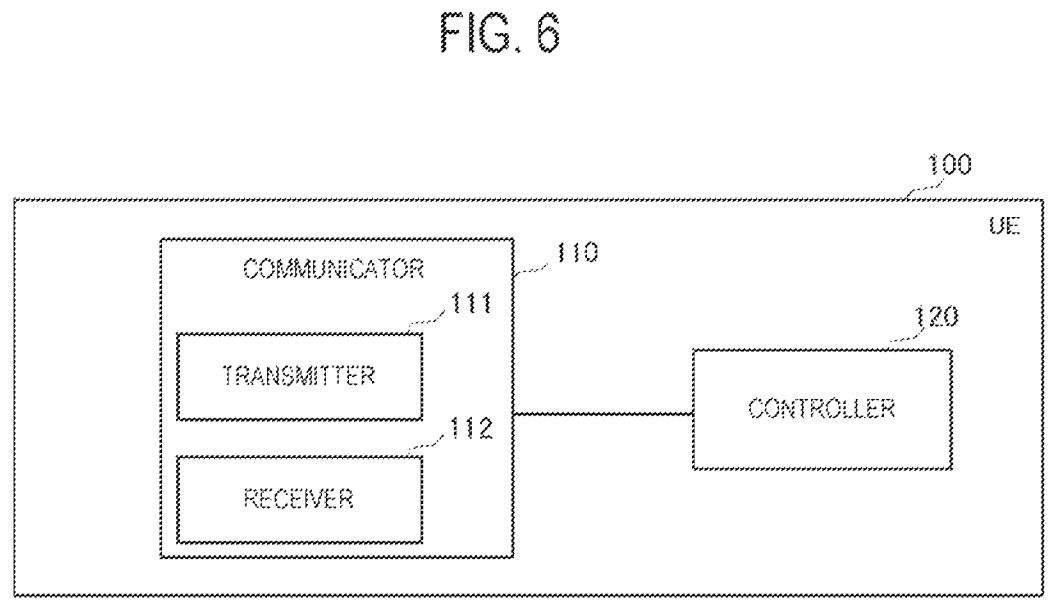

Figure 10:
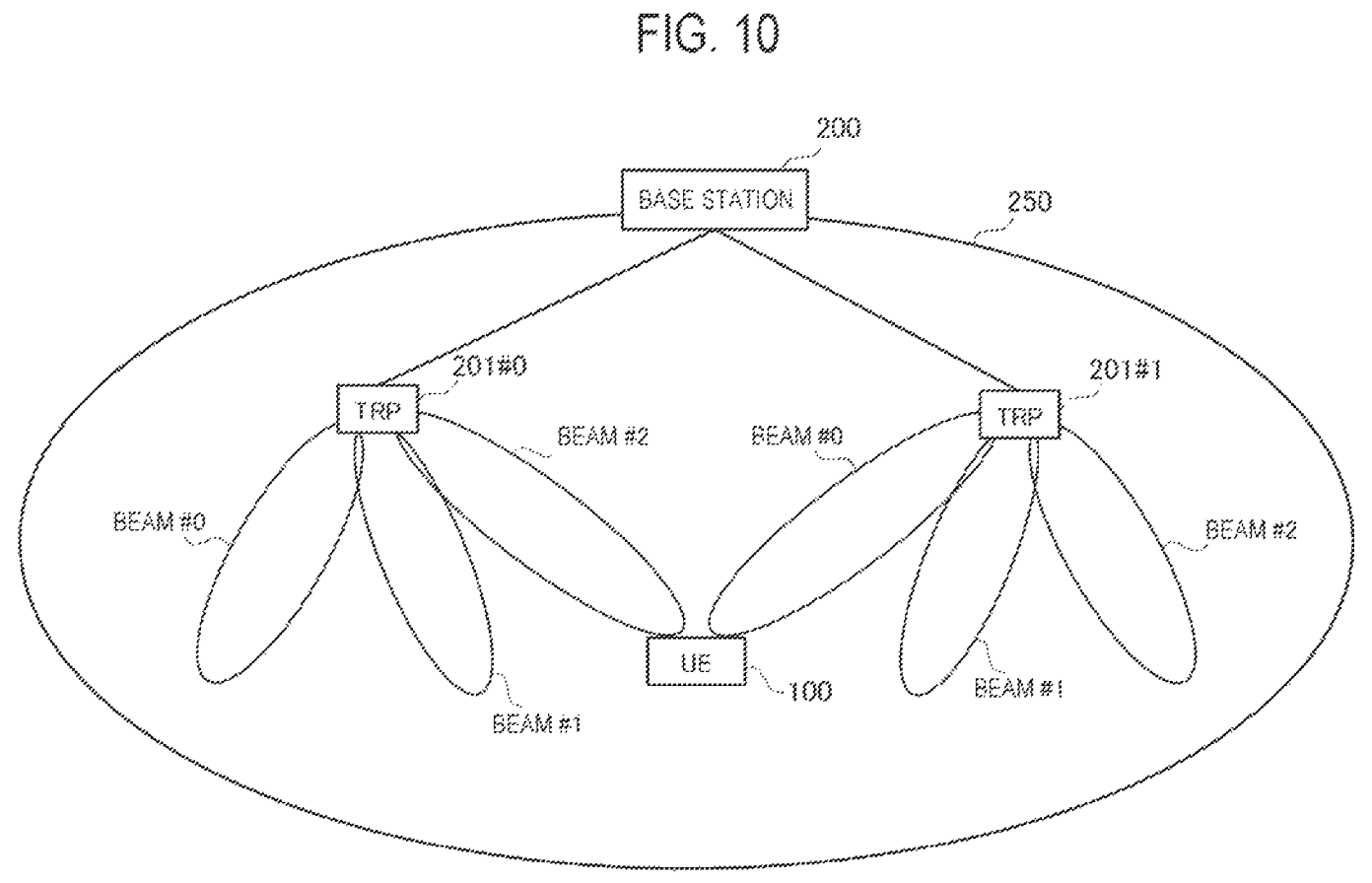

Figure 11:
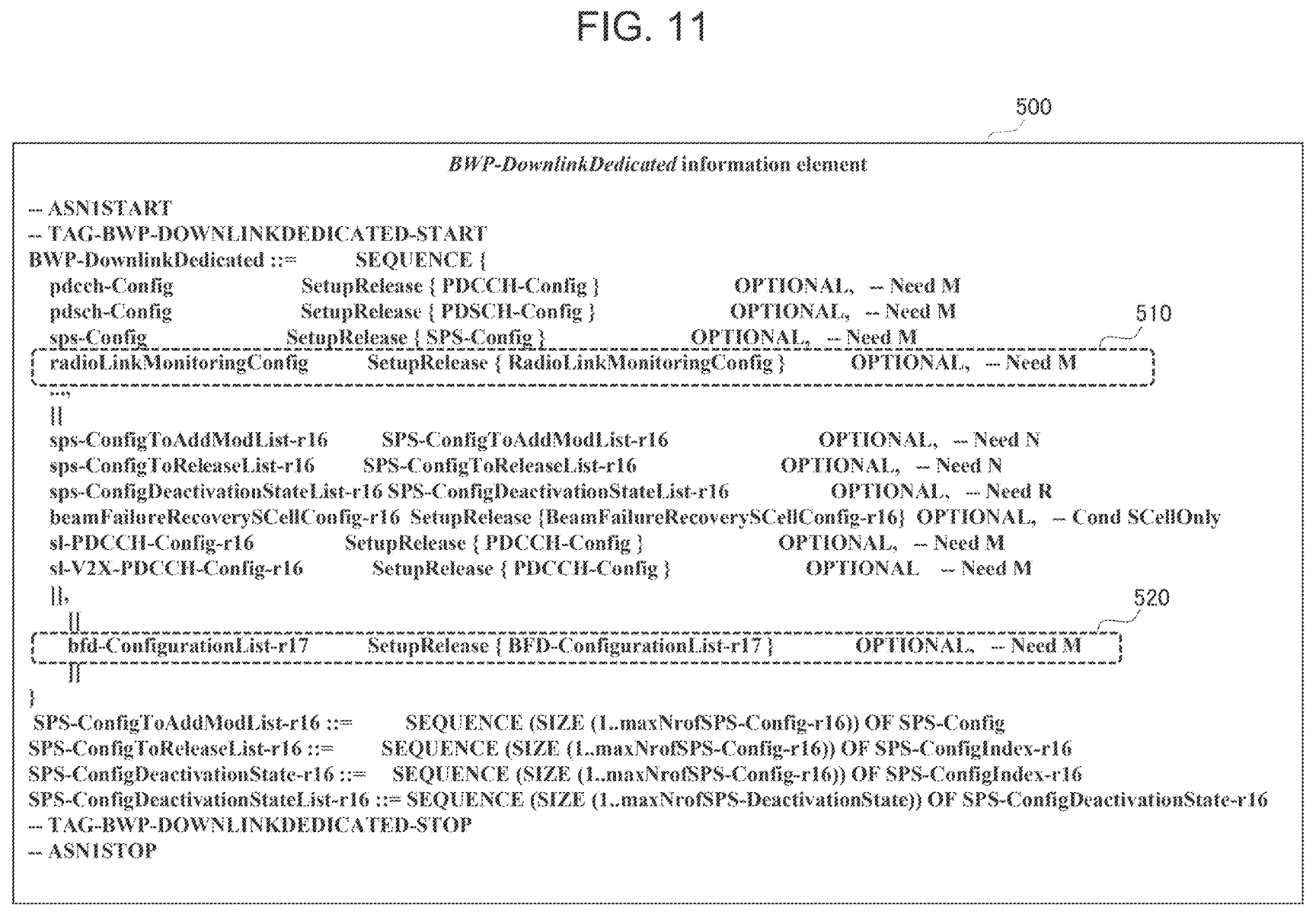

*BWP-DownlinkDedicated information element*

500

```
-- ASN1START
-- TAG-BWP-DOWNLINKDEDICATED-START
BWP-DownlinkDedicated ::=           SEQUENCE {
  pdcch-Config            SetupRelease { PDCCH-Config }           OPTIONAL,  -- Need M
  pdsch-Config            SetupRelease { PDSCH-Config }           OPTIONAL,  -- Need M
  sps-Config              SetupRelease { SPS-Config }             OPTIONAL,  -- Need M
  radioLinkMonitoringConfig   SetupRelease { RadioLinkMonitoringConfig }   OPTIONAL,  -- Need M     510
  ...,
  [[
  sps-ConfigToAddModList-r16        SPS-ConfigToAddModList-r16            OPTIONAL,  -- Need N
  sps-ConfigToReleaseList-r16       SPS-ConfigToReleaseList-r16           OPTIONAL,  -- Need N
  sps-ConfigDeactivationStateList-r16 SPS-ConfigDeactivationStateList-r16  OPTIONAL,  -- Need R
  beamFailureRecoverySCellConfig-r16 SetupRelease { BeamFailureRecoverySCellConfig-r16} OPTIONAL,  -- Cond SCellOnly
  sl-PDCCH-Config-r16               SetupRelease { PDCCH-Config }         OPTIONAL,  -- Need M
  sl-V2X-PDCCH-Config-r16           SetupRelease { PDCCH-Config }         OPTIONAL,  -- Need M
  ]],
  [[
  bfd-ConfigurationList-r17         SetupRelease { BFD-ConfigurationList-r17}         OPTIONAL,  -- Need M     520
  ]]
}
SPS-ConfigToAddModList-r16 ::=      SEQUENCE (SIZE (1..maxNrofSPS-Config-r16)) OF SPS-Config
SPS-ConfigToReleaseList-r16 ::=     SEQUENCE (SIZE (1..maxNrofSPS-Config-r16)) OF SPS-ConfigIndex-r16
SPS-ConfigDeactivationState-r16 ::=  SEQUENCE (SIZE (1..maxNrofSPS-Config-r16)) OF SPS-ConfigIndex-r16
SPS-ConfigDeactivationStateList-r16 ::= SEQUENCE (SIZE (1..maxNrofSPS-DeactivationState)) OF SPS-ConfigDeactivationState-r16
-- TAG-BWP-DOWNLINKDEDICATED-STOP
-- ASN1STOP
```

FIG. 12

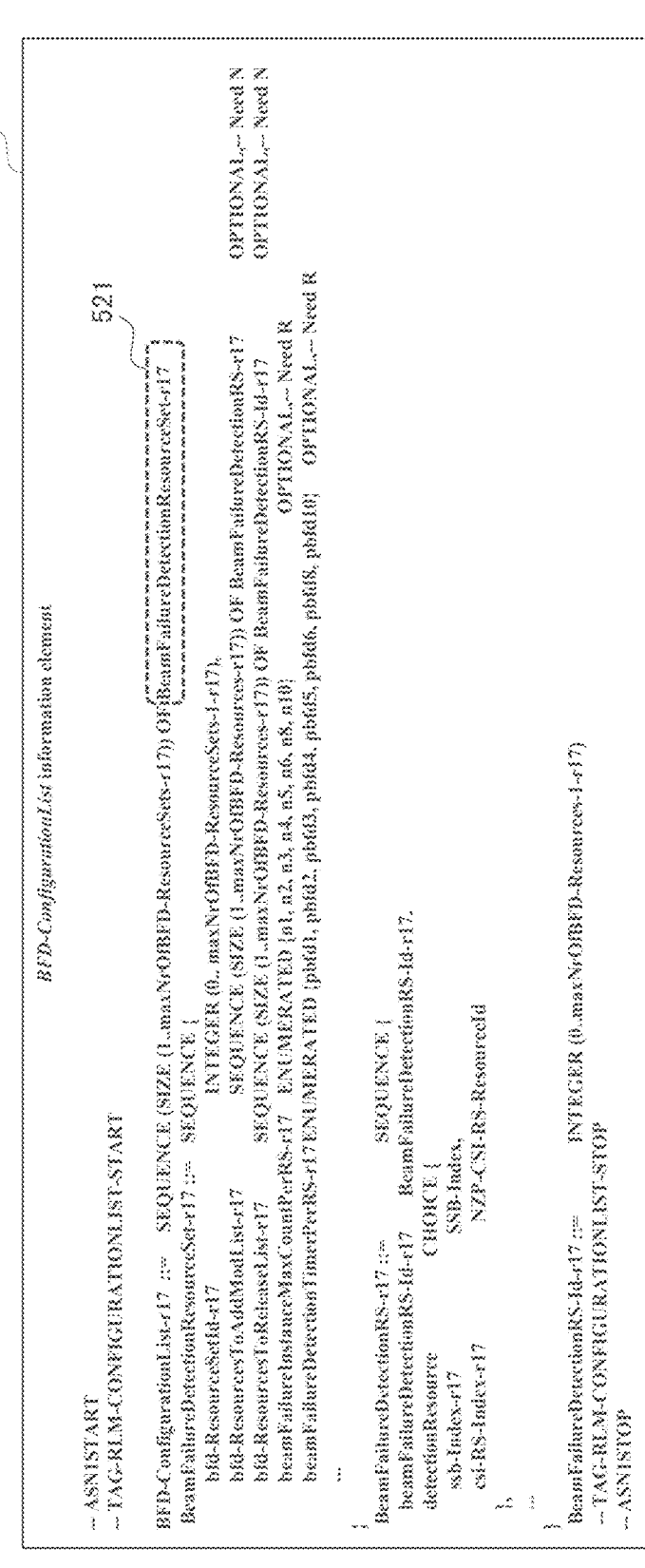

*BFD-ConfigurationList information element*

```
-- ASN1START
-- TAG-RLM-CONFIGURATIONLIST-START

BFD-ConfigurationList-r17 ::=    SEQUENCE (SIZE (1..maxNrOfBFD-ResourceSets-r17)) OF {BeamFailureDetectionResourceSet-r17}
BeamFailureDetectionResourceSet-r17 ::=    SEQUENCE {
    bfd-ResourceSetId-r17                INTEGER (0..maxNrOfBFD-ResourceSets-1-r17),
    bfd-ResourcesToAddModList-r17       SEQUENCE (SIZE (1..maxNrOfBFD-Resources-r17)) OF BeamFailureDetectionRS-r17    OPTIONAL,-- Need N
    bfd-ResourcesToReleaseList-r17      SEQUENCE (SIZE (1..maxNrOfBFD-Resources-r17)) OF BeamFailureDetectionRS-Id-r17  OPTIONAL,-- Need N
    beamFailureInstanceMaxCountPerRS-r17  ENUMERATED {n1, n2, n3, n4, n5, n6, n8, n10}           OPTIONAL,-- Need R
    beamFailureDetectionTimerPerRS-r17  ENUMERATED {pbfd1, pbfd2, pbfd3, pbfd4, pbfd5, pbfd6, pbfd8, pbfd10}   OPTIONAL,-- Need R
    ...
}

BeamFailureDetectionRS-r17 ::=          SEQUENCE {
    beamFailureDetectionRS-Id-r17       BeamFailureDetectionRS-Id-r17,
    detectionResource                   CHOICE {
        ssb-Index-r17                   SSB-Index,
        csi-RS-Index-r17                NZP-CSI-RS-ResourceId
    },
    ...
}

BeamFailureDetectionRS-Id-r17 ::=       INTEGER (0..maxNrOfBFD-Resources-1-r17)
-- TAG-RLM-CONFIGURATIONLIST-STOP
-- ASN1STOP
```

| BeamFailureDetectionConfig field descriptions |
|---|
| beamFailureDetectionTimer |
| Timer for beam failure detection (see TS 38.321 [3], clause 5.17). See also the BeamFailureRecoveryConfig IE. Value in number of "Q_out,LR reporting periods of Beam Failure Detection" Reference Signal (see TS 38.213 [13], clause 6). Value pbfd1 corresponds to 1 Q_out,LR reporting period of Beam Failure Detection Reference Signal, value pbfd2 corresponds to 2 Q_out,LR reporting periods of Beam Failure Detection Reference Signal and so on. |
| beamFailureInstanceMaxCount |
| This field determines after how many beam failure events the UE triggers beam failure recovery (see TS 38.321 [3], clause 5.17). Value n1 corresponds to 1 beam failure instance, value n2 corresponds to 2 beam failure instances and so on. |
| bfd-ResourcesToAddModList |
| A list of reference signals for detecting beam failure. The limits of the reference signals that the network can configure are specified in TS 38.321 [3], table 5-1. The network configures at most [TBD] detectionResources per resource set. For each BeamFailureDetectionResourceSet, if no RSs are provided for the purpose of beam failure detection, the UE performs beam monitoring based on the activated TCI-State for PDCCH associated with the corresponding coresetPoolIndex. The beamFailureDetectionRS-Id of 1 is associate with the coresetPoolIndex of 0. The beamFailureDetectionRS-Id of 1 is associate with the coresetPoolIndex of 1, and so on. |

| BeamFailureDetectionRS field descriptions |
|---|
| detectionResource: |
| A reference signal that the UE shall use for beam failure detection. |
```

FIG. 13

MAC

BEAM FAILURE DETECTION/RECOVERY PROCESSING

TIMER #0

TIMER #1

COUNTER #0

COUNTER #1

BEAM FAILURE DETECTION/RECOVERY FOR EACH BFD RESOURCE SET

BEAM FAILURE INSTANCE INDICATION AND BFD RESOURCE SET IDENTIFIER

PHY

BEAM MONITORING FOR EACH BFD RESOURCE SET

If a UE is configured with *bfd-ConfigurationList* for each BWP of a serving cell, a set $q_0$ of periodic CSI-RS resource configuration indexes by *bfd-ResourcesToAddModList* is provided for each beam failure detection resource set identified by *bfd-ResourceSetId*. If the UE is not provided $q_0$ by *bfd-ResourcesToAddModList* for a beam failure detection resource set, the UE determines the set $q_0$ to include periodic CSI-RS resource configuration indexes with same values as the RS indexes in the RS sets indicated by *TCI-State* for respective CORESETs in the *coresetPoolIndex* associated with the *bfd-ResourceSetId* that the UE uses for monitoring PDCCH and, if there are two RS indexes in a TCI state, the set $q_0$ includes RS indexes configured with *qcl-Type* set to 'typeD' for the corresponding TCI states.

```
RadioLinkMonitoringConfig information element

-- ASN1START
-- TAG-RADIOLINKMONITORINGCONFIG-START
RadioLinkMonitoringConfig ::=    SEQUENCE {
    failureDetectionResourcesToAddModList  SEQUENCE (SIZE(1..maxNrofFailureDetectionResources)) OF RadioLinkMonitoringRS-Id
                                  OPTIONAL, -- Need N
    failureDetectionResourcesToReleaseList SEQUENCE (SIZE(1..maxNrofFailureDetectionResources)) OF RadioLinkMonitoringRS-Id
                                  OPTIONAL, -- Need N
    beamFailureInstanceMaxCount   ENUMERATED {n1, n2, n3, n4, n5, n6, n8, n10}   OPTIONAL, -- Need R
    beamFailureDetectionTimer     ENUMERATED {pbfd1, pbfd2, pbfd3, pbfd4, pbfd5, pbfd6, pbfd8, pbfd10}  OPTIONAL, -- Need R
    ...
}
RadioLinkMonitoringRS ::=    SEQUENCE {
    radioLinkMonitoringRS-Id    RadioLinkMonitoringRS-Id,
    purpose                     ENUMERATED {beamFailure, rlf, both},
    detectionResource           CHOICE {
        ssb-Index               SSB-Index,
        csi-RS-Index            NZP-CSI-RS-ResourceId
    },
    ...
}
-- TAG-RADIOLINKMONITORINGCONFIG-STOP
-- ASN1STOP
```

| RadioLinkMonitoringConfig field descriptions |
| --- |
| beamFailureDetectionTimer<br>Timer for beam failure detection (see TS 38.321 [3], clause 5.17). See also the BeamFailureRecoveryConfig IE. Value in number of "$Q_{out,LR}$ reporting periods of Beam Failure Detection" Reference Signal (see TS 38.213 [13], clause 6). Value pbfd1 corresponds to 1 $Q_{out,LR}$ reporting period of Beam Failure Detection Reference Signal, value pbfd2 corresponds to 2 $Q_{out,LR}$ reporting periods of Beam Failure Detection Reference Signal and so on. |
| beamFailureInstanceMaxCount<br>This field determines after how many beam failure events the UE triggers beam failure recovery (see TS 38.321 [3], clause 5.17). Value n1 corresponds to 1 beam failure instance, value n2 corresponds to 2 beam failure instances and so on. |
| failureDetectionResourcesToAddModList<br>A list of reference signals for detecting beam failure and/or cell level radio link failure (RLF). The limits of the reference signals that the network can configure are specified in TS 38.213 [13], table 5-1. The network configures at most two detectionResources per BWP for the purpose beamFailure or both. If no RSs are provided for the purpose of beam failure detection, the UE performs beam monitoring based on the activated TCI-State for PDCCH as described in TS 38.213 [13], clause 6. If no RSs are provided in this list for the purpose of RLF detection, the UE performs Cell-RLM based on the activated TCI-State of PDCCH as described in TS 38.213 [13], clause 5. The network ensures that the UE has a suitable set of reference signals for performing cell-RLM. If bfd-ConfigurationList is configured for the active BWP (i.e. beam failure detection is performed per the beam failure detection resource set), the purpose of the reference signals configured via this list shall be set to rlf. |

The MAC entity shall for each Serving Cell configured for beam failure detection:

1> if one or more *BeamFailureDetectionResourceSet* is configured: ~S501

2> for the Beam Failure Detection resource set identified by *bfd-ResourceSetId*, if beam failure instance indication has been received from lower layers: ~S502

3> start or restart the *beamFailureDetectionTimerPerRS* configured for the Beam Failure Detection resource set identified by *bfd-ResourceSetId*; ~S503

3> increment BFI_COUNTER_BFD_RS by 1; ~S504

3> if BFI_COUNTER_BFD_RS >= *beamFailureInstanceMaxCountPerRS*: ~S505

4> if the Serving Cell is SpCell; and ~S506

4> if beam failure was detected on the other Beam Failure Detection resource sets and none of them has not been recovered by the beam recovery procedure yet: ~S507

5> initiate a Random Access procedure (see clause 5.1) on the SpCell for beam recovery. ~S508

4> else: ~S509

5> trigger a BFR for this Beam Failure Detection resource set ~S510

2> for each Beam Failure Detection resource set, if the *beamFailureDetectionTimerPerRS* expires; or ~S511

2> if *beamFailureDetectionTimerPerRS, beamFailureInstanceMaxCountPerRS*, or any of the reference signals used for beam failure detection is reconfigured by upper layers associated with this Beam Failure Detection resource set: ~S512

3> set BFI_COUNTER_BFD_RS to 0. ~S513

2> if the Serving Cell is SpCell and the Random Access procedure initiated for SpCell beam failure recovery is successfully completed (see clause 5.1): ~S514

3> set BFI_COUNTER_BFD_RS to 0; ~S515

3> stop the *beamFailureRecoveryTimerPerRS*, if configured; ~S516

3> consider the Beam Failure Recovery procedure successfully completed. ~S517

2> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Beam Failure Detection resource set; or ~S518

2> if the SCell is deactivated as specified in clause 5.9: ~S519

3> set BFI_COUNTER_BFD_RS to 0; ~S520

3> consider the Beam Failure Recovery procedure successfully completed and cancel all the triggered BFRs for this Beam Failure Detection resource set. ~S521

FIG. 24

The MAC entity shall:

1> If the Beam Failure Recovery procedure determines that at least one BFR has been triggered and not cancelled for an SCell or a Beam Failure Detection resource set for which evaluation of the candidate beams according to the requirements as specified in TS 38.133 [11] has been completed:  ~S531

2> if UL-SCH resources are available for a new transmission and if the UL-SCH resources can accommodate the BFR MAC CE plus its subheader as a result of LCP:  ~S532

3> instruct the Multiplexing and Assembly procedure to generate the BFR MAC CE.  ~S533

2> else if UL-SCH resources are available for a new transmission and if the UL-SCH resources can accommodate the Truncated BFR MAC CE plus its subheader as a result of LCP:  ~S534

3> instruct the Multiplexing and Assembly procedure to generate the Truncated BFR MAC CE.  ~S535

2> else:  ~S536

3> trigger the SR for SCell beam failure recovery for each SCell or beam failure recovery for each Beam Failure Detection resource set for which BFR has been triggered, not cancelled, and for which evaluation of the candidate beams according to the requirements as specified in TS 38.133 [11] has been completed.  ~S537

All BFRs triggered for an SCell or a Beam Failure Detection resource set shall be cancelled when a MAC PDU is transmitted and this PDU includes a BFR MAC CE or Truncated BFR MAC CE which contains beam failure information of that SCell or Beam Failure Detection resource set.  ~S538

COMMUNICATION APPARATUS, BASE STATION, AND COMMUNICATION METHOD

CROSS-REFERENCE TO RELATED APPLICATIONS

The present application is a continuation application of international Patent Application No. PCT/JP2022/025394, filed on Jun. 24, 2022, which designated the U.S., and claims the benefit of priority of Japanese Patent Application No. 2021-106434, filed on Jun. 28, 2021, the entire contents of which are incorporated herein by reference.

TECHNICAL FIELD

The present disclosure relates to a communication apparatus, a base station, and a communication method used in a mobile communication system.

BACKGROUND ART

In recent years, in 3rd Generation Partnership Project (3GPP) (registered trademark) (the same applies in the following), which is a mobile communication system standardization project, introduction of multi-transmission/reception point (TRP) transmission has been studied as an extension of multi-input multi-output (MIMO) (see Non Patent Literature 1).

In the multi-TRP transmission, one cell is configured by a plurality of TRPs provided in a distributed manner, and radio communication with a communication apparatus is performed by simultaneously using the plurality of TRPs, whereby efficient transmission can be implemented. It has been proposed to perform beam failure detection and recovery, which have hitherto been performed at cell level, at TRP level during such cell operation with a plurality of TRPs (see Non Patent Literatures 2 and 3). The TRP may be referred to as a panel or an antenna panel.

CITATION LIST

Non Patent Literature

Non Patent Literature 1: 3GPP Contribution RP-202803 "Summary for WI: Enhancement on MIMO for NR"
Non Patent Literature 2: 3GPP Contribution R2-2105870 "Beam failure with mTRP"
Non Patent Literature 3: 3GPP Contribution R2-2105341 "Discussion on RAN2 specification impacts of TRP-specific BFR"

SUMMARY OF INVENTION

In order to appropriately perform beam failure detection and recovery at TRP level, it is necessary to define a specific behavior for performing the beam failure detection and recovery at TRP level in the communication apparatus.

Therefore, an object of the present disclosure is to provide a communication apparatus, a base station, and a communication method that enable appropriate beam failure detection and recovery at TRP level during cell operation with a plurality of TRPs.

A communication apparatus according to a first feature performs radio communication with a base station that manages a cell including N (N≥2) transmission/reception points. The communication apparatus comprises: a communicator configured to receive a radio resource control (RRC) message from the base station, the RRC message including information for configuring N beam failure detection resource sets; and a controller configured to individually detect beam failure for each of the N beam failure detection resource sets. The controller is configured to trigger beam failure recovery (BFR) for one beam failure detection resource set with which the beam failure has been detected. The controller is configured to cancel all the triggered BFRs for the one beam failure detection resource set in a case where a medium access control (MAC) protocol data unit (PDU) is transmitted, the MAC protocol data unit (PDU) including a BFR MAC control element (CE) including information regarding the detected beam failure.

A base station according to a second feature manages a cell including N (N≥2) transmission/reception points. The base station comprises: a transmitter configured to transmit, to a communication apparatus, a radio resource control (RRC) message including information for configuring N beam failure detection resource sets; and a controller configured to control communication with the communication apparatus. Each of the N beam failure detection resource sets is used for individually detecting beam failure in the communication apparatus. The controller is configured to control to trigger beam failure recovery (BFR) for one beam failure detection resource set with which the beam failure has been detected. The controller is configured to control to cancel all the triggered BFRs for the one beam failure detection resource set in a case where a medium access control (MAC) protocol data unit (PDU) is transmitted, the MAC protocol data unit (PDU) including a BFR MAC control element (CE) including information regarding the detected beam failure.

A communication method according to a third feature is executed by a communication apparatus that performs radio communication with a base station that manages a cell including N (N≥2) transmission/reception points. The communication method comprises the steps of: receiving a radio resource control (RRC) message from the base station, the RRC message including information for configuring N beam failure detection resource sets; individually detecting beam failure for each of the N beam failure detection resource sets; triggering beam failure recovery (BFR) for one beam failure detection resource set with which the beam failure has been detected; and canceling all the triggered BFRs for the one beam failure detection resource set in a case where a medium access control (MAC) protocol data unit (PDU) is transmitted, the MAC protocol data unit (PDU) including a BFR MAC control element (CE) including information regarding the detected beam failure.

BRIEF DESCRIPTION OF DRAWINGS

The foregoing and other objects, features, and advantages of the present disclosure will become more apparent from the following detailed description with reference to the accompanying drawings. The drawings are as follows.

FIG. 2 is a diagram illustrating a configuration example of a protocol stack in the mobile communication system according to one embodiment.

FIG. 3 is a diagram illustrating an operation example in a case where beam failure is detected in a secondary cell (SCell) during cell operation with a single transmission/reception point (TRP).

FIG. 4 is a diagram illustrating an operation example in a case where beam failure is detected in a special cell (SpCell) during cell operation with a single TRP.

FIG. 6 is a diagram illustrating a configuration of a UE according to one embodiment.

FIG. 10 is a diagram illustrating the BFD operation at TRP level according to one embodiment.

FIG. 11 is a diagram illustrating a configuration example of a bandwidth part (BWP) configuration (BWP-DownlinkDedecated) according to one embodiment.

FIG. 12 is a diagram illustrating a configuration example of a BFD configuration list (BFD-ConfigurationList) according to one embodiment.

FIG. 13 is a diagram illustrating an operation in the UE according to one embodiment.

FIG. 14 is a diagram for describing an operation in a case where a reference signal resource for BFD is not provided according to one embodiment.

FIG. 16 is a diagram for describing the operation in a case where the reference signal resource for BFD is not provided according to one embodiment.

FIG. 19 is a diagram illustrating a configuration example of a radio link monitoring configuration (RadioLinkMonitoringConfig) according to one embodiment.

FIG. 20 is a diagram illustrating a comparative example of a BFD/beam failure recovery (BFR) operation in the SpCell according to one embodiment.

FIG. 22 is a diagram illustrating the BFD/BFR operation in the SpCell according to one embodiment.

FIG. 23 is a diagram illustrating a specific example of an operation of a medium access control (MAC) entity in the UE according to one embodiment.

FIG. 24 is a diagram illustrating the specific example of the operation of the MAC entity in the UE according to one embodiment.

DESCRIPTION OF EMBODIMENTS

Therefore, an embodiment provides a communication apparatus, a base station, and a communication method enabling to efficiently switch a PDCCH monitoring condition.

Mobile Communication System

Figure 1:
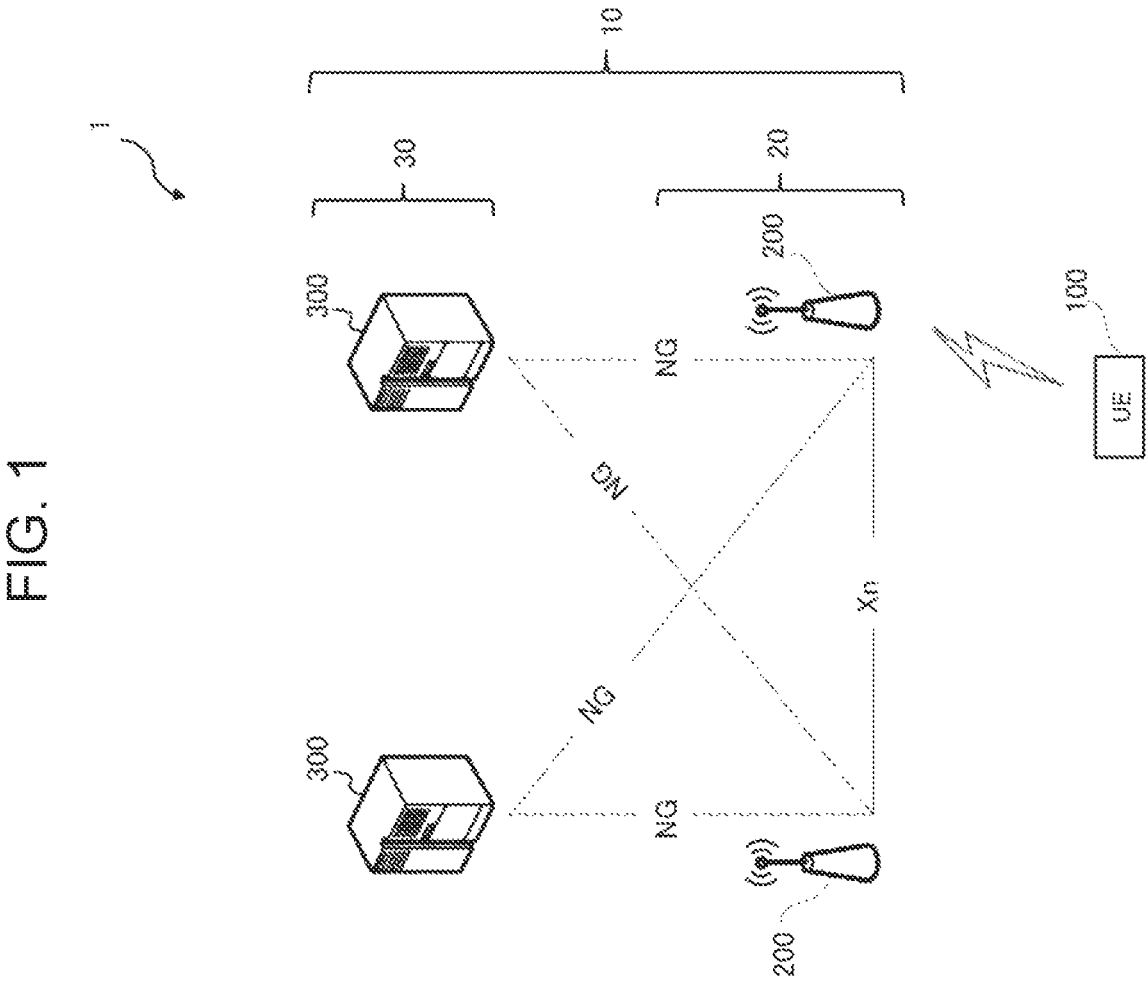
FIG. 1 is a diagram illustrating a configuration of a mobile communication system according to one embodiment.

First, a configuration of a mobile communication system 1 according to an embodiment will be described with reference to FIG. 1. The mobile communication system 1 is, for example, a system conforming to a technical specification (TS) of 3rd Generation Partnership Project (3GPP). Hereinafter, as the mobile communication system 1, a description will be given, as an example, as to the 5th generation system (5GS) of the 3GPP standard, that is, a mobile communication system based on New Radio (NR).

The mobile communication system 1 includes a network 10 and a user equipment (UE) 100 that communicates with the network 10. The network 10 includes a next generation radio access network (NG-RAN) 20, which is a 5G radio access network, and a 5G core network (5GC) 30, which is a 5G core network.

The UE 100 is an apparatus used by a user. The UE 100 is, for example, a mobile apparatus such as a mobile phone terminal such as a smartphone, a tablet terminal, a notebook personal computer (PC), a communication module, or a communication card. The UE 100 may be a vehicle (for example, a car or a train) or an apparatus provided in the vehicle. The UE 100 may be a transport body other than a vehicle (for example, a ship or an airplane) or an apparatus provided in the transport body. The UE 100 may be a sensor or an apparatus provided in the sensor. The UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

The NG-RAN 20 includes a plurality of base stations 200. Each of the base stations 200 manages at least one cell. A cell forms a minimum unit of a communication area. One cell belongs to one frequency (a carrier frequency) and is formed by one component carrier. The term "cell" may represent a radio communication resource, and may also represent a communication target of the UE 100. Each base station 200 can perform radio communication with the UE 100 existing in its own cell. The base station 200 communicates with the UE 100 by using a protocol stack of the RAN. The base station 200 provides NR user plane and control plane protocol terminations towards the UE 100 and is connected to the 5GC 30 via an NG interface. Such an NR base station 200 may be referred to as a gNodeB (gNB).

The 5GC 30 includes a core network apparatus 300. The core network apparatus 300 includes, for example, an access and mobility management function (AMF) and/or a user plane function (UPF). The AMF performs mobility management of the UE 100. The UPF provides a function specialized for user plane processing. The AMF and the UPF are connected to the base station 200 via the NG interface.

Next, a configuration example of a protocol stack in the mobile communication system 1 according to the embodiment will be described with reference to FIG. 2.

A protocol of a radio section between the UE 100 and the base station 200 includes a physical (PHY) layer, a medium access control (MAC) layer, a radio link control (RLC) layer, a packet data convergence protocol (PDCP) layer, and a radio resource control (RRC) layer.

The PHY layer performs encoding and decoding, modulation and demodulation, antenna mapping and demapping, and resource mapping and demapping. Data and control information are transmitted between the PHY layer of the UE 100 and the PHY layer of the base station 200 via a physical channel.

The physical channel includes a plurality of orthogonal frequency division multiplexing (OFDM) symbols in the time domain and a plurality of subcarriers in the frequency domain. One subframe includes a plurality of OFDM symbols in the time domain. A resource block is a resource allocation unit, and includes a plurality of OFDM symbols and a plurality of subcarriers. A frame can be composed of 10 ms, and can include 10 subframes composed of 1 ms. A number of slots corresponding to a subcarrier spacing may be included in the subframe.

Among the physical channels, a physical downlink control channel (PDCCH) plays a central role for purposes such as, for example, downlink scheduling allocation, uplink scheduling grant, and transmission power control.

In the NR, the UE 100 can use a bandwidth narrower than a system bandwidth (that is, the bandwidth of the cell). The base station 200 configures, for the UE 100, a bandwidth part (BWP) including consecutive physical resource blocks (PRBs). The UE 100 transmits and receives data and a control signal in an active BWP. In the UE 100, for example, a maximum of four BWPs can be configured. The BWPs may have different subcarrier spacings or may have frequencies overlapping each other. In a case where a plurality of BWPs is configured for the UE 100, the base station 200 can designate which BWP is to be activated by control in downlink. As a result, the base station 200 can dynamically adjust a UE bandwidth according to the amount of data traffic of the UE 100 and the like, and can reduce the UE power consumption.

The base station 200 may configure, for example, a maximum of three control resource sets (CORESETs) for each of a maximum of four BWPs on a serving cell. The CORESET is a radio resource for control information to be received by the UE 100. A maximum of 12 CORESETs may be configured on the serving cell for the UE 100. Each CORESET has an index of 0 to 11. For example, the CORESET includes six resource blocks (PRB) and one, two, or three consecutive OFDM symbols in the time domain.

The MAC layer performs priority control of data, retransmission processing by a hybrid automatic repeat request (HARQ), a random access procedure, and the like. Data and control information are transmitted between the MAC layer of the UE 100 and the MAC layer of the base station 200 via a transport channel. The MAC layer of the base station 200 includes a scheduler. The scheduler determines uplink and downlink transport formats (transport block size and modulation and coding scheme (MCS)) and resources to be allocated to the UE 100.

The RLC layer transmits data to the RLC layer on a reception side using the functions of the MAC layer and the PHY layer. Data and control information are transmitted between the RLC layer of the UE 100 and the RLC layer of the base station 200 via a logical channel.

The PDCP layer performs header compression and decompression and encryption and decryption.

A service data adaptation protocol (SDAP) layer may be provided as an upper layer of the PDCP layer. The service data adaptation protocol (SDAP) layer performs mapping between an IP flow that is a unit in which a core network performs quality of service (QoS) control, and a radio bearer that is a unit in which an access stratum (AS) performs QoS control.

The RRC layer controls the logical channel, the transport channel, and the physical channel according to establishment, reestablishment, and release of the radio bearer. RRC signaling for various configurations is transmitted between the RRC layer of the UE 100 and the RRC layer of the base station 200. In a case where there is an RRC connection between the RRC layer of the UE 100 and the RRC layer of the base station 200, the UE 100 is in an RRC connected state. In a case where there is no RRC connection between the RRC layer of the UE 100 and the RRC layer of the base station 200, the UE 100 is in an RRC idle state. In a case where an RRC connection between the RRC layer of the UE 100 and the RRC layer of the base station 200 is suspended, the UE 100 is in an RRC inactive state.

A non-access stratum (NAS) layer located above the RRC layer performs session management and mobility management of the UE 100. NAS signaling is transmitted between the NAS layer of the UE 100 and the NAS layer of the core network apparatus 300 (AMF). Note that the UE 100 has an application layer and the like in addition to a protocol of a radio interface.

Outline of Beam Failure Detection and Recovery

Next, an outline of beam failure detection and recovery will be described with reference to FIGS. 3 and 4.

The NR can perform broadband transmission in a high frequency band such as a millimeter wave band or a terahertz wave band as compared with Long Term Evolution (LTE) which is the fourth generation radio access technology. In order to compensate for radio wave attenuation for radio waves in such a high frequency band, the NR uses highly directional beamforming using a large number of antennas between the base station 200 and the UE 100 to obtain high beam gain. In the NR, a beam control technology for establishing and maintaining a beam pair between the base station 200 and the UE 100 is introduced. The beam failure detection and recovery technology is one of such beam control technologies.

For beam failure detection (BFD), the base station 200 configures, for the UE 100, a downlink reference signal resource for detecting beam failure. Such a reference signal resource is any one of a synchronization signal (SS)/PBCH block (SSB) and a channel state information reference signal (CSI-RS). The SSB includes a primary synchronization signal (PSS), a secondary synchronization signal (SSS), a physical broadcast channel (PBCH), and a demodulation reference signal (DMRS). For example, the SSB may be composed of four consecutive OFDM symbols in the time domain. In addition, the SSB may be composed of 240 consecutive subcarriers (that is, 20 resource blocks) in the frequency domain. The PBCH is a physical channel that carries a master information block (MIB). The CSI-RS is a reference signal that is transmitted for the UE 100 to measure a state of a radio channel.

In a case where the SSB is within a band of a downlink BWP, the UE 100 can detect beam failure by using the SSB. In a case where the SSB is not within the band of the downlink BWP, the UE 100 can detect beam failure by using the CSI-RS configured from the base station 200.

In the UE 100, the MAC layer counts a beam failure event (beam failure instance indication) notified from the physical layer with a counter, and detects (declares) beam failure when the count value becomes greater than or equal to a specified number of times before the expiration of a timer.

FIG. 3 is a diagram illustrating an operation example in a case where beam failure is detected in a secondary cell (SCell) during cell operation with a single transmission/reception point (TRP).

FIG. 3 illustrates an example in which the base station 200 manages an SCell 250B including one TRP 201. The base station 200 (TRP 201) forms a total of three beams of beams #0 to #2. The UE 100 detects beam failure during communication using the beam #0 in the SCell 250B.

In this case, the UE 100 triggers beam failure recovery (BFR) by initiating transmission of a beam failure recovery MAC control element (BFR MAC CE). Here, the UE 100 selects a beam (for example, the beam #1) suitable for the SCell, and indicates the selected beam information together with information regarding the beam failure by the BFR MAC CE. When the UE 100 receives the PDCCH indicating uplink grant for new transmission of the HARQ process used for the transmission of the BFR MAC CE, the beam failure recovery in the SCell 250B is completed.

FIG. 4 is a diagram illustrating an operation example in a case where beam failure is detected in a special cell (SpCell) during cell operation with a single TRP. The SpCell may be referred to as a primary cell (PCell).

FIG. 4 illustrates an example in which the base station 200 manages an SpCell 250A including one TRP 201. The base station 200 (TRP 201) forms a total of three beams of beams #0 to #2. The UE 100 detects beam failure during communication using the beam #0 in the SpCell 250A.

In this case, the UE 100 triggers the BFR by initiating a random access procedure for the SpCell 250A. Here, the UE 100 selects an appropriate beam (for example, the beam #1) for performing the BFR. When the random access procedure is completed, the BFR is completed.

Outline of Multi-TRP Transmission

Figure 5:
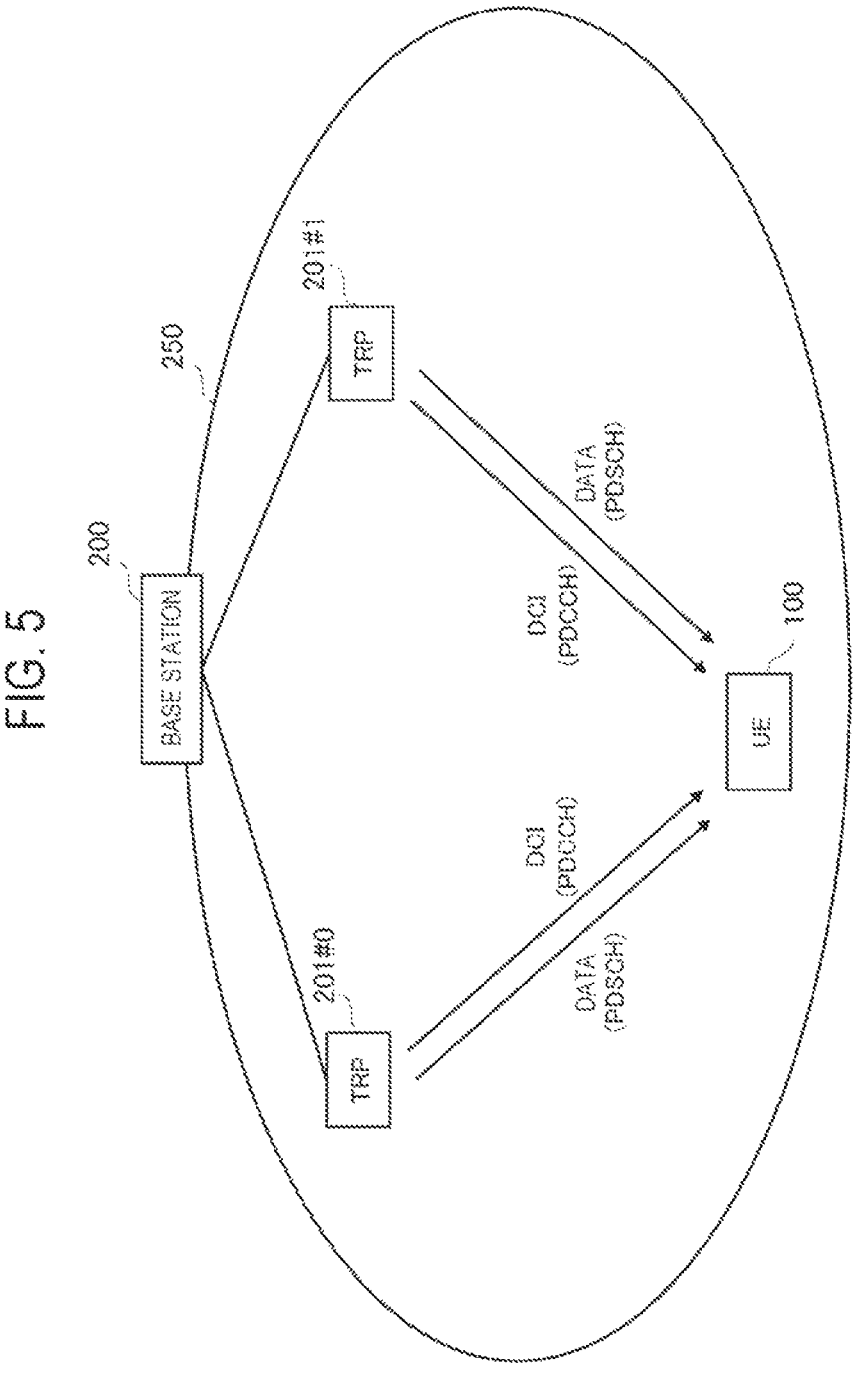
FIG. 5 is a diagram illustrating an outline of multi-TRP transmission according to one embodiment.

Next, an outline of multi-TRP transmission according to the embodiment will be described with reference to FIG. 5.

In the multi-TRP transmission, the base station 200 configures one cell 250 with a plurality of TRPs 201 provided in a distributed manner. FIG. 5 illustrates two TRPs (TRP 201 #0 and TRP 201 #0) as the plurality of TRPs 201. However, the base station 200 may configure one cell 250 with three or more TRPs 201. Hereinafter, a case where the number of TRPs 201 included in one cell 250 is two will be mainly described.

In the multi-TRP transmission, different pieces of data are transmitted from the plurality of TRPs 201 to perform spatial multiplexing, and a data rate can be increased. Alternatively, it is also possible to transmit the same data from the plurality of TRPs 201 to achieve diversity, thereby improving transmission reliability and robustness.

For the multi-TRP transmission, there are a scheme using a single PDCCH and a scheme using a plurality of PDCCHs. In the scheme using a single PDCCH, one TRP 201 transmits a PDCCH (downlink control information (DCI)) and schedules a set of physical uplink shared channel (PDSCH) layers for each TRP 201. On the other hand, in the scheme using a plurality of PDCCHs, each TRP 201 individually schedules its own PDSCH. In the following, the scheme using a plurality of PDCCHs is mainly assumed.

In the scheme using a plurality of PDCCHs, a different CORESET can be configured for each TRP 201. Specifically, the TRP 201 and a CORESET pool index are associated on a one-to-one basis. When configuring the CORESET for the UE 100, the base station 200 notifies the UE 100 of the CORESET pool index to which the CORESET belongs. As such, the CORESET pool index may be considered to be an index that identifies the TRP 201.

In the embodiment, during such cell operation using a plurality of TRPs 201, it is assumed that BFD/BFR that has hitherto been performed at cell 250 level is performed at TRP 201 level. Specifically, a TRP 201-specific counter/timer for detecting beam failure is introduced, and in the UE 100, the beam failure instance indication notified from the physical layer to the MAC layer is counted with the counter, and beam failure is detected when the count value becomes greater than or equal to a specified number of times before expiration of the timer.

It is considered that it is necessary to individually configure, for the UE 100, a beam failure detection resource set (hereinafter, referred to as a "BFD resource set") including a reference signal resource for detecting beam failure for each TRP 201 in order to perform such BFD/BFR at TRP 201 level. However, in the existing 3GPP technical specification, there is no mechanism for configuring, for the UE 100, the BFD resource set for each TRP 201. In one embodiment, BFD/BFR can be performed at TRP 201 level.

In addition, in a case where it is essential to individually configure, for the UE 100, the reference signal resource for BFD for each TRP 201, there is a possibility that the amount of signaling for BFD/BFR increases. In one embodiment, a mechanism that enables BFD/BFR also for a BFD resource set or TRP 201 from or for which no reference signal resource for BFD is provided is implemented.

In addition, existing radio link monitoring (that is, radio link failure (RLF) detection and beam failure detection) is performed not at TRP 201 level but at cell 250 level. In one embodiment, it is possible to enable appropriate coexistence of such an existing technology and BFD at TRP 201 level. Furthermore, even in a case where the UE 100 detects beam failure for all the TRPs 201, communication (data transmission/reception) can be performed as long as any of the TRPs 201 is recovered from the beam failure. In a case where the random access procedure for recovering from the beam failure is initiated without considering whether or not recovery from the beam failure has occurred, data transmission/reception cannot be performed during the random access procedure, and communication is interrupted. In one embodiment, it is possible to suppress such communication interruption.

Configuration of Communication Apparatus

Next, a configuration example of the UE 100 according to one embodiment will be described with reference to FIG. 6. The UE 100 includes a communicator 110 and a controller 120.

The communicator 110 performs radio communication with the base station 200 by transmitting and receiving a radio signal to and from the base station 200. The communicator 110 includes at least one transmitter 111 and at least one receiver 112. The transmitter 111 and the receiver 112 may include a plurality of antennas and a radio frequency (RF) circuit. The antenna converts a signal into a radio wave and emits the radio wave into space. Furthermore, the antenna receives a radio wave in space and converts the radio wave into a signal. The RF circuit performs analog processing of a signal transmitted and received via the antenna. The RF circuit may include a high frequency filter, an amplifier, a modulator, a low pass filter, and the like.

The controller 120 performs various types of control in the UE 100. The controller 120 controls communication with the base station 200 via the communicator 110. The operation of the UE 100 described above and described later may be an operation under the control of the controller 120. The controller 120 may include at least one processor capable of executing a program and a memory that stores the program. The processor may execute the program to perform the operation of the controller 120. The controller 120 may include a digital signal processor that executes digital processing of a signal transmitted and received via the antenna and the RF circuit. The digital processing includes processing of the protocol stack of the RAN. The memory stores the program executed by the processor, a parameter related to the program, and data related to the program. The memory may include at least one of a read only memory (ROM), an erasable programmable read only memory (EPROM), an electrically erasable programmable read only memory (EE-PROM), a random access memory (RAM), or a flash memory. All or part of the memory may be included in the processor.

In the UE 100 according to one embodiment, the communicator 110 performs radio communication with the base station 200 that manages the cell 250 having N TRPs 201 (N≥2). The communicator 110 receives, from the base station 200, an RRC message including a beam failure detection configuration (hereinafter, referred to as a "BFD configuration list") which is information for configuring N BFD resource sets and is associated with a downlink BWP that is a part of the bandwidth of the cell 250. The controller 120 individually detects beam failure for each of the N BFD resource sets in radio communication using the downlink BWP. As a result, during operation of the cell 250 with the plurality of TRPs 201, the BFD resource set for each TRP 201 can be configured for the UE 100 in the RRC layer, so that BFD/BFR can be performed at TRP 201 level. As a result, even in a case where a failure occurs in one TRP 201, communication can be continued with the other TRP 201, so that failure resistance of communication can be enhanced.

In addition, in the UE 100 according to one embodiment, in a case where there is a BFD resource set that does not provide a reference signal resource for detecting beam failure, the controller 120 detects beam failure for the BFD resource set by using a predetermined reference signal resource instead of the reference signal resource. For example, the controller 120 specifies an active transmission configuration indication (TCI) state for a PDCCH based on a CORESET pool index associated with the BFD resource set, and detects beam failure for the BFD resource set by using a reference signal resource indicated by the active TCI state as the predetermined reference signal resource. As a result, during the operation of the cell 250 using the plurality of TRPs 201, BFD/BFR can be performed also for a TRP for which the reference signal resource is not provided. As a result, the amount of signaling can be reduced.

Furthermore, in the UE 100 according to an embodiment, the communicator 110 receives, from the base station 200, an RRC message including a radio link monitoring configuration for configuring radio link monitoring at cell 250 level and a BFD configuration list for configuring N BFD resource sets. The controller 120 detects RLF at cell 250 level based on the radio link monitoring configuration, and individually detects beam failure for each of the N BFD resource sets 521 #0 and 521 #1 based on a BFD configuration list 520. As a result, during operation of the cell 250 with the plurality of TRPs 201, radio link monitoring at cell 250 level and BFD at TRP 201 level can appropriately coexist. As a result, it is possible to implement two-stage failure detection and recovery based on RLF detection and recovery at cell 250 level and BFD/BFR at TRP 201 level, and thus, it is possible to enhance failure resistance of communication.

In addition, in the UE 100 according to one embodiment, in a case where beam failure is detected for all of the N BFD resource sets, the controller 120 determines whether or not to initiate the random access procedure for the cell 250 (specifically, the SpCell) based on a state of recovery from the beam failure. For example, the controller 120 that has detected beam failure for one BFD resource set detects beam failure for another BFD resource set, and initiates the random access procedure for the cell 250 only in a case where there has been no recovery from beam failure for any of the BFD resource sets. As a result, communication can be continued as long as possible by reflecting the state of BFR as a condition for initiating the random access procedure.

Configuration of Base Station

Figure 7:
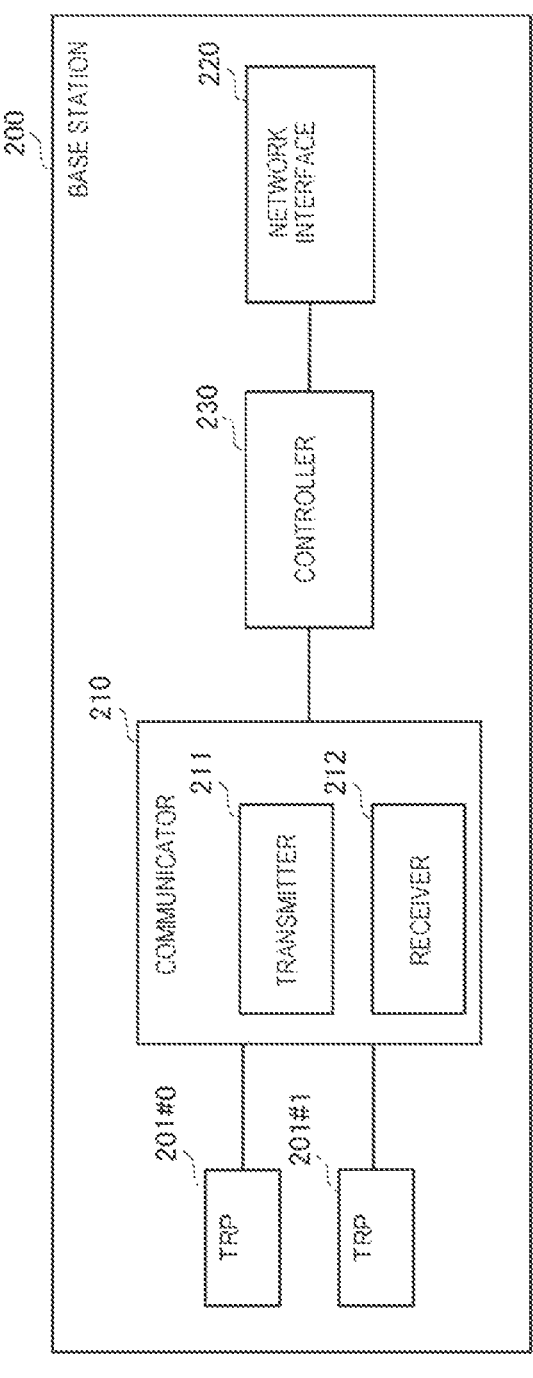
FIG. 7 is a diagram illustrating a configuration of a base station according to one embodiment.

Next, a configuration of the base station 200 according to one embodiment will be described with reference to FIG. 7. The base station 200 includes N TRPs 201 (TRP 201 #0 and TRP 201 #1 in the example of FIG. 7), a communicator 210, a network interface 220, and a controller 230.

Each TRP 201 includes a plurality of antennas and has beamforming capability. The TRP 201 may be referred to as a panel or an antenna panel. The antenna converts a signal into a radio wave and emits the radio wave into space. Furthermore, the antenna receives a radio wave in space and converts the radio wave into a signal. The TRPs 201 are arranged in a dispersed manner and are included in one cell 250. In a case where the base station 200 manages a plurality of cells, the base station 200 may have N TRPs 201 for each cell.

For example, the communicator 210 receives a radio signal from the UE 100 and transmits a radio signal to the UE 100. The communicator 210 includes at least one transmitter 211 and at least one receiver 212. The transmitter 211 and the receiver 212 may include an RF circuit. The RF circuit performs analog processing of a signal transmitted and received via the antenna. The RF circuit may include a high frequency filter, an amplifier, a modulator, a low pass filter, and the like.

The network interface 220 transmits and receives a signal to and from a network. The network interface 220 receives, for example, a signal from a neighboring base station connected via an Xn interface, which is an interface between base stations, and transmits the signal to the neighboring base station. In addition, the network interface 220 receives, for example, a signal from the core network apparatus 300 connected via the NG interface, and transmits the signal to the core network apparatus 300.

The controller 230 performs various types of control in the base station 200. The controller 230 controls, for example, communication with the UE 100 via the communicator 210. Furthermore, the controller 230 controls, for example, communication with a node (for example, the neighboring base station and the core network apparatus 300) via the network interface 220. The operation of the base station 200 described above and described later may be an operation under the control of the controller 230. The controller 230 may include at least one processor capable of executing a program and a memory that stores the program. The processor may execute the program to perform the operation of the controller 230. The controller 230 may include a digital signal processor that executes digital processing of a signal transmitted and received via an antenna and an RF circuit. The digital processing includes processing of the protocol stack of the RAN. The memory stores the program executed by the processor, a parameter related to the program, and data related to the program. All or part of the memory may be included in the processor.

The base station 200 according to one embodiment manages the cell 250 including N TRPs 201 and performs radio communication with the UE 100. The communicator 210 transmits, to the UE 100, the RRC message including a BFD configuration list which is a list for configuring N BFD resource sets and is associated with a downlink BWP that is a part of the bandwidth of the cell 250. The BFD configuration list is used by the UE 100 to individually detect beam failure for each of the N BFD resource sets in the radio communication using the downlink BWP. As a result, during operation of the cell 250 with the plurality of TRPs 201, the BFD resource set for each TRP 201 can be configured for the UE 100 in the RRC layer, so that the UE 100 can perform BFD/BFR at TRP 201 level. As a result, even in a case where a failure occurs in one TRP 201, the UE 100 can continue communication with the other TRP 201, so that failure resistance of communication can be enhanced.

Furthermore, in the base station 200 according to an embodiment, the controller 230 generates the RRC message including the radio link monitoring configuration for configuring radio link monitoring at cell 250 level and the BFD configuration list for configuring N BFD resource sets. The communicator 210 transmits the RRC message to the UE 100. The radio link monitoring configuration includes information indicating the reference signal resource and information indicating the purpose of the reference signal resource. In a case where the UE 100 is configured with the BFD configuration list, the controller 120 sets RLF detection as the purpose of the reference signal resource in the radio link monitoring configuration without configuring beam failure detection. As a result, during operation of the cell 250 with the plurality of TRPs 201, radio link monitoring at cell 250 level and BFD at TRP 201 level can appropriately coexist. As a result, the UE 100 can implement two-stage failure detection and recovery based on RLF detection and recovery at cell 250 level and BFD/BFR at TRP 201 level, and thus, it is possible to enhance failure resistance of communication.

Beam Failure Detection Operation at TRP Level

Next, a BFD operation at TRP 201 level according to one embodiment will be described with reference to FIGS. 8 to 10.

Figure 8:
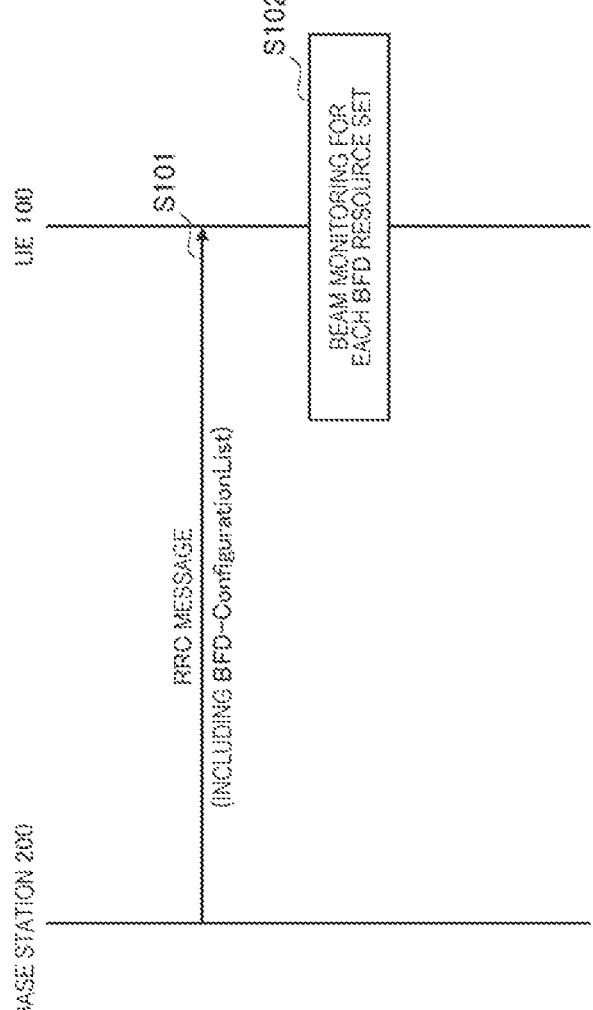
FIG. 8 is a diagram illustrating a beam failure detection (BFD) operation at TRP level according to one embodiment.

As illustrated in FIG. 8, in step S101, the base station 200 (the communicator 210) that manages the cell 250 including N TRPs 201 transmits, to the UE 100, the RRC message including the BFD configuration list which is a list for configuring N BFD resource sets and is associated with the downlink BWP that is a part of the bandwidth of the cell 250. The UE 100 (communicator 110) receives the RRC message. Note that the RRC message may be a UE-specific RRC message, and may be, for example, an RRC Reconfiguration message.

By associating the downlink BWP with the BFD configuration list in this manner, the BFD configuration list can be individually configured for each downlink BWP. Therefore, an optimal BFD configuration list can be set according to a requirement for the downlink BWP.

In step S102, the UE 100 (the controller 120) individually detects beam failure for each of the N BFD resource sets based on the BFD configuration list configured by the base station 200 in the radio communication using the downlink BWP (beam monitoring). In a case where beam failure has been detected for any of the BFD resource sets, the UE 100 (the controller 120) initiates (triggers) a BFR procedure for recovery from the detected beam failure.

Figure 9:
FIG. 9 is a diagram illustrating a configuration example of a radio resource control (RRC) message according to one embodiment.

As illustrated in FIG. 9, the RRC message according to one embodiment includes a downlink BWP configuration (BWP-DownlinkDedicated) 500 for configuring the downlink BWP (specifically, a UE-specific downlink BWP) for the UE 100. The BWP configuration (BWP-DownlinkDedicated) 500 is an information element for configuring a UE-specific parameter of the downlink BWP. The BWP configuration (BWP-DownlinkDedicated) 500 can include a radio link monitoring configuration (RadioLinkMonitoring-Config) 510 for configuring radio link monitoring at cell 250 level and the BFD configuration list (BFD-Configuration-List) 520 for configuring N BFD resource sets. By including the BFD configuration list (BFD-ConfigurationList) 520 in the BWP configuration (BWP-DownlinkDedicated) 500, the BFD configuration list (BFD-ConfigurationList) 520 can be configured for each downlink BWP configured for the UE 100. In a case where the downlink BWP configured in the BWP configuration (BWP-DownlinkDedicated) 500 is used for radio communication, that is, in a case where the downlink BWP is an active BWP, the UE 100 (the controller 120) performs beam monitoring by using the BFD configuration list (BFD-ConfigurationList) 520 associated with the downlink BWP.

Here, the BFD configuration list (BFD-ConfigurationList) 520 is an information element different from the radio link monitoring configuration (RadioLinkMonitoringConfig) 510. Specifically, the radio link monitoring configuration (RadioLinkMonitoringConfig) 510 is an information element defined in the existing technical specification, and the BFD configuration list (BFD-ConfigurationList) 520 is a new information element not defined in the existing technical specification. In this way, by introducing a new information element for BFD at TRP 201 level, BFD at TRP 201 level becomes possible, and coexistence with the existing radio link monitoring becomes possible.

The BFD configuration list (BFD-ConfigurationList) 520 includes N BFD resource sets (BFD Resource Sets) 521. For example, in a case where N=2, the BFD configuration list (BFD-ConfigurationList) 520 includes two BFD resource sets (BFD Resource Sets) 521 #0 and 521 #1. Each BFD resource set (BFD Resource Set) 521 includes a reference signal resource in downlink. The reference signal resource is either an SSB or a CSI-RS. Here, the reference signal resource in the BFD resource set (BFD Resource Set) 521 is configured as a reference signal resource used to detect beam failure. In other words, the reference signal resource in the BFD resource set (BFD Resource Set) 521 is not configured as a reference signal resource used to detect RLF. As will be described in detail below, in one embodiment, RLF detection is performed at cell 250 level by using the radio link monitoring configuration (RadioLinkMonitoring-Config) 510, and beam failure detection is performed at TRP 201 level by using the BFD configuration list (BFD-Con-figurationList) 520.

In one embodiment, the N BFD resource sets (BFD Resource Sets) 521 are associated with the N TRPs 201 on a one-to-one basis. For example, the BFD resource set (BFD Resource Set) 521 #0 is associated with the TRP 201 #0, and the BFD resource set (BFD Resource Set) 521 #1 is associated with the TRP 201 #1. This enables BFD at TRP 201 level.

Furthermore, in one embodiment, each BFD resource set (BFD Resource Set) 521 may include one or more reference signal resources, and each of the one or more reference signal resources may be associated with a beam on a one-to-one basis. For example, as illustrated in FIG. 10, it is assumed that the TRP 201 #0 forms three beams #0 to #2 and the TRP 201 #1 forms three beams #0 to #2. In such a case, the base station 200 (the controller 230) configures, for the UE 100, the BFD resource set (BFD Resource Set) 521 #0 associated with the TRP 201 #0 and the BFD resource set (BFD Resource Set) 521 #1 associated with the TRP 201 #1 by the RRC message. Then, the base station 200 (the controller 230) configures three reference signal resources associated with the three beams #0 to #2 on a one-to-one basis in the BFD resource set (BFD Resource Set) 521 #0. In addition, the base station 200 (the controller 230) configures three reference signal resources associated with the three beams #0 to #2 on a one-to-one basis in the BFD resource set (BFD Resource Set) 521 #1. As a result, the UE 100 (the controller 120) can detect beam failure for each TRP 201 and for each beam.

Next, a specific example of the RRC message according to one embodiment will be described with reference to FIGS. 11 and 12. FIGS. 11 and 12 illustrate description examples in the technical specification (TS 38.331) of the RRC layer of 3GPP.

As illustrated in FIG. 11, the BWP configuration (BWP-DownlinkDedicated) 500 for configuring the UE-specific downlink BWP for the UE 100 can include the radio link monitoring configuration (RadioLinkMonitoringConfig) 510 for configuring radio link monitoring at cell 250 level and the BFD configuration list (BFD-ConfigurationList-r17) 520 for configuring N BFD resource sets. Here, "-r17" means an information element introduced in Release 17 of the 3GPP standard, but may also be an information element introduced in Release 18 or later. Hereinafter, the notation of "-r17" is appropriately omitted.

Note that the BFD configuration list (BFD-Configuration-List) 520 configured for the UE 100 can be released by a release instruction from the base station 200. For example, in a case of changing from cell operation with a plurality of TRPs to cell operation with a single TRP, the base station 200 transmits, to the UE 100, the release instruction to release the BFD configuration list (BFD-ConfigurationList) 520 configured for the UE 100. The UE 100 releases the configured BFD configuration list (BFD-ConfigurationList) 520 in response to the reception of the release instruction.

As illustrated in FIG. 12, the BFD configuration list (BFD-ConfigurationList) 520 includes up to maxNrOfBFD-ResourceSets of BFD resource sets (BFD Resource Sets) 521.

Each BFD resource set (BFD Resource Set) 521 can include a BFD resource set identifier (bfd-ResourceSetId) that identifies the BFD resource set, an addition/modification list (bfd-ResourcesToAddModList) for adding/modifying one or a plurality of reference signal resources, a release list (bfd-ResourcesToReleaseList) for releasing one or a plurality of reference signal resources, a maximum count value (beamFailureInstanceMaxCountPerRS) of the beam failure instance indications from the physical layer, and a timer value (beamFailureDetectionTimerPerRS) for detecting beam failure.

The BFD resource set identifier (bfd-ResourceSetId) is an identifier that identifies a BFD resource set. The BFD resource set identifier (bfd-ResourceSetId) may be considered to be an identifier that identifies a corresponding TRP 201. The BFD resource set identifier (bfd-ResourceSetId) may be associated with the CORESET pool index (coresetPoolIndex) on a one-to-one basis. For example, "0" of the BFD resource set identifier (bfd-ResourceSetId) is associated with "0" of the CORESET pool index (coresetPoolIndex), and "1" of the BFD resource set identifier (bfd-ResourceSetId) is associated with "1" of the CORESET pool index (coresetPoolIndex).

The addition/modification list (bfd-ResourcesToAddModList) is a list of one or a plurality of reference signal resources (BeamFailureDetectionRS) to be added or modified. Specifically, the addition/modification list (bfd-ResourcesToAddModList) is a list of reference signals for detecting beam failure, and reference signal limitation that can be set by the network (base station 200) is specified in the technical specification (for example, Table 5-1 in TS 38.213). The network (base station 200) configures a maximum predetermined number of reference signal resources for each resource set. As will be described in detail below, in a case where no reference signal is provided for the purpose of BFD for each BFD resource set (BFD Resource Set) 521, the UE 100 performs beam monitoring based on the active TCI state for a PDCCH associated with the corresponding CORESET pool index (coresetPoolIndex).

The reference signal resource (BeamFailureDetectionRS) to be configured includes a reference signal resource identifier (beamFailureDetectionRS-Id) that identifies the reference signal resource, and a reference signal resource (detectionResource) that is a reference signal to be used by the UE 100 for BFD. The reference signal resource (detectionResource) is configured with an SSB index (ssb-Index) or a CSI-RS index (csi-RS-Index).

The release list (bfd-ResourcesToReleaseList) is a list of the reference signal resource identifiers (beamFailureDetectionRS-Id) of reference signal resources to be released.

The maximum count value (beamFailureInstanceMaxCountPerRS) indicates the number of beam failure events (that is, the number of beam failure instance indications from the physical layer) for which the UE 100 triggers the BFR procedure. For example, a value "n1" corresponds to one beam failure instance indication and a value "n2" corresponds to two beam failure instances. The timer value (beamFailureDetectionTimerPerRS) is a timer for BFD.

As described above, in a case where a beam failure event (beam failure instance indication) is notified from the physical layer a specified number of times within a specified time, the MAC layer of the UE 100 (the controller 120) detects beam failure. Each BFD resource set (BFD Resource Set) 521 includes information for configuring the specified time and the specified number of times independently of other BFD resource sets. The maximum count value (beamFailureInstanceMaxCountPerRS) indicating the specified number of times and the timer (beamFailureDetectionTimerPerRS) indicating the specified time are configured for each BFD resource set (BFD Resource Set) 521, that is, for each TRP 201. As a result, a condition for detecting beam failure can be optimized for each TRP 201.

As illustrated in FIG. 13, in the UE 100, the physical (PHY) layer evaluates radio link quality for each configured BFD resource set. The radio link quality may be a block error rate (BLER) of the PDCCH. For example, in a case where the radio link quality of all reference signal resources in the BFD resource set is lower than a threshold, the physical layer periodically outputs the beam failure instance indication to the MAC layer along with the BFD resource set identifier (bfd-ResourceSetId) of the BFD resource set. This period is configured to, for example, the larger one of the period of the minimum reference signal in the BFD resource set and 2 ms. Note that the BFD resource set identifier (bfd-ResourceSetId) may be used as the beam failure instance indication.

Each BFD resource set (BFD Resource Set) 521 may include information for setting the threshold to be compared with the radio link quality measured by the physical layer independently of other BFD resource sets. The physical layer notifies the MAC layer of the beam failure event (beam failure instance indication) indicating the BFD resource set (BFD Resource Set) 521 in response to the radio link quality in any BFD resource set (BFD Resource Set) 521 being lower than the threshold associated with the BFD resource set (BFD Resource Set) 521. As a result, the threshold to be compared with the radio link quality can be individually set for each BFD resource set (BFD Resource Set) 521, that is, for each TRP 201, so that the condition for detecting the beam failure event can be optimized for each TRP 201.

The MAC layer manages the timer and the counter for each configured BFD resource set, and performs BFD/BFR for each BFD resource set. FIG. 13 illustrates an example in which there are two BFD resource sets, and the MAC layer manages a timer #0 and a counter #0 for a BFD resource set #0 and a timer #1 and a counter #1 for a BFD resource set #1.

Upon receiving the beam failure instance indication together with the BFD resource set identifier (bfd-Resource-SetId) from the physical layer, the MAC layer starts the timer corresponding to the BFD resource set identifier (bfd-ResourceSetId) and increments (that is, add 1 to) the counter corresponding to the BFD resource set identifier (bfd-ResourceSetId). When the count value of the counter becomes greater than or equal to the specified number of times before the expiration of the timer, the MAC layer detects beam failure for the BFD resource set corresponding to the counter. Details of such an operation will be described later.

Operation in Case where Reference Signal Resource Used for Beam Failure Detection is not Provided Next, an operation in a case where the reference signal resource for BFD is not provided according to one embodiment will be described with reference to FIGS. 14 to 16.

In a case where it is essential to individually configure, for the UE 100, the reference signal resource (BeamFailureDe-tectionRS) for BFD for each TRP 201, there is a possibility that the amount of signaling for BFD increases. In one embodiment, a mechanism that enables BFD/BFR even for the BFD resource set (BFD Resource Set) or TRP 201 from or for which the reference signal resource (BeamFailureDe-tectionRS) for BFD is not provided is implemented.

Here, beamforming in the NR will be described. In order to perform a multi-beam operation of the PDCCH, the NR supports a TCI state configuration, which is an upper layer configuration for beamforming, for each CORESET. In a case where the UE 100 monitors a PDCCH search space associated with the CORESET, the UE 100 receives the PDCCH with the CORESET based on the TCI state con-figuration for the CORESET. Beam information for PDCCH reception is implicitly recognized by the UE 100 through a quasi-co-location (QCL) relationship between a downlink reference signal (in particular, a CSI-RS associated with the beam) and a demodulation reference signal (DMRS) of the PDCCH. The DMRS of the PDCCH has a quasi-co-location relationship with the downlink reference signal according to QCL-TypeA and/or QCL-TypeD. The QCL-TypeA corre-sponds to channel statistical properties observed at the UE 100 side, such as the Doppler shift, the Doppler spread, average delay, and delay spread. The QCL-TypeD corre-sponds to reception beam information on the UE 100 side. In a case of the QCL-TypeD, it may be assumed that spatial parameters are the same between the downlink reference signal and the DMRS of the PDCCH. In a case where the DMRS of the PDCCH is in a quasi-co-location relationship with the downlink reference signal of the QCL-TypeD, the PDCCH can be received by using the same spatial reception parameter that is used by the UE 100 to receive the downlink reference signal in beamforming.

As illustrated in FIG. 14, the base station 200 can explic-itly configure a QCL relationship for the UE 100 by RRC signaling. The UE 100 is configured with a plurality of TCI states configured for the CORESET to receive the PDCCH. Each TCI state includes a parameter related to the downlink reference signal resource and the QCL relationship between the downlink reference signal related to the QCL-TypeA and the QCL-TypeD, and the DMRS port of the PDCCH. The UE 100 uses only one beam to receive one PDCCH. Therefore, in a case where a plurality of TCI states are configured for the CORESET, the base station 200 activates, by using an activation command by the MAC CE, one of the TCI states used for the CORESET.

In one embodiment, the UE 100 that performs radio communication with the base station 200 that manages the cell 250 having N TRPs 201 includes the communicator 110 that receives the BFD configuration list (BFD-Configura-tionList) 520 for configuring the N BFD resource sets (BFD Resource Sets) 521 from the base station 200, and the controller 120 that individually detects beam failure for each of the N BFD resource sets (BFD Resource Sets) 521 based on the BFD configuration list 520. In a case where there is a BFD resource set (BFD Resource Set) 521 that does not provide the reference signal resource (BeamFailureDetec-tionRS) for BFD, the controller 120 detects beam failure for the BFD resource set (BFD Resource Set) 521 by using a predetermined reference signal resource instead of the ref-erence signal resource (BeamFailureDetectionRS).

Figure 15:
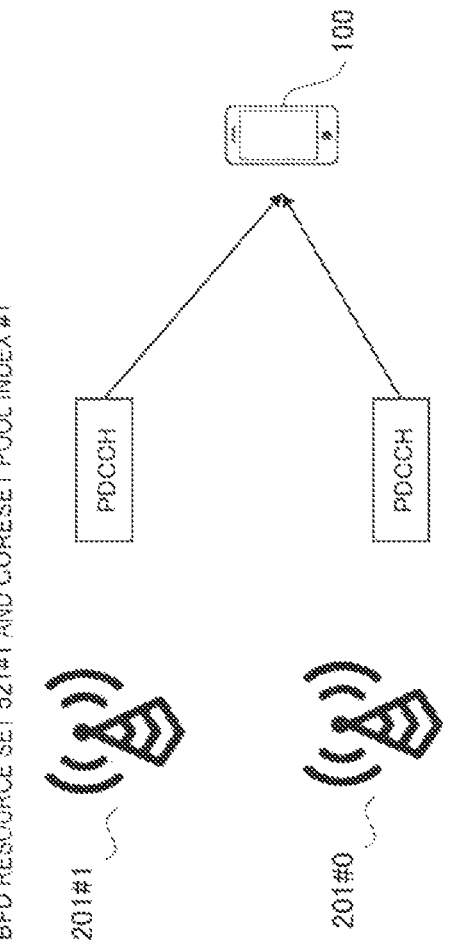
FIG. 15 is a diagram for describing the operation in a case where the reference signal resource for BFD is not provided according to one embodiment.

As illustrated in FIG. 15, in a case where there is a BFD resource set (BFD Resource Set) 521 (here, the BFD resource set 521 #0) that does not provide the reference signal resource (BeamFailureDetectionRS), the UE 100 (the controller 120) specifies an active TCI state for the PDCCH based on the CORESET pool index #0 associated with the BFD resource set (BFD Resource Set) 521 #0, and detects beam failure for the BFD resource set (BFD Resource Set) 521 #0 by using the reference signal resource indicated by the active TCI state as the predetermined reference signal resource. For example, the UE 100 (the controller 120) determines the downlink reference signal (for example, CSI-RS) indicated by the active TCI state among the TCI states (that is, the TCI states for the PDCCH) configured for the CORESET belonging to the CORESET pool index #0 as the reference signal resource (BeamFailureDetectionRS) for BFD. Thereby, even in a case where the BFD resource set (BFD Resource Set) 521 does not provide the reference signal resource (BeamFailureDetectionRS), BFD can be performed using the downlink reference signal indicated by the active TCI state for the PDCCH.

FIG. 16 illustrates a specific example of such an opera-tion. Note that FIG. 16 illustrates a description example in the technical specification (TS 38.213) of the physical layer of 3GPP.

As illustrated in FIG. 16, it is assumed that the UE 100 is configured with the BFD configuration list (bfd-Configura-tionList) 520 for the BWP of the serving cell. In such a case, the addition/modification list (bfd-ResourcesToAddMod-List) provides a set $q_0$ of periodic CSI-RS resource configu-ration indexes to each BFD resource set (BFD Resource Set) 521 identified by the BFD resource set identifier (bfd-ResourceSetId).

In a case where the set $q_0$ is not provided by the addition/modification list (bfd-ResourcesToAddModList) for the BFD resource set (BFD Resource Set) 521, the UE 100 determines to include, in the set $q_0$, a periodic CSI-RS resource configuration index with the same value as the reference signal index of the downlink reference signal set indicated by the TCI state of each CORESET belonging to the CORESET pool index associated with the BFD resource set identifier (bfd-ResourceSetId) used to monitor the PDCCH. In a case there are two reference signal indexes in the TCI state, a reference signal index whose qcl-Type of the corresponding TCI state is set to "typeD" is included in the set $q_0$.

Coexistence with Existing Radio Link Monitoring

Next, coexistence with the existing radio link monitoring will be described with reference to FIGS. 17 to 19. Note that FIG. 19 illustrates a description example in the technical specification (TS 38.331) of the RRC layer of 3GPP.

As described above, the existing radio link monitoring (that is, RLF detection and beam failure detection) is performed not at TRP 201 level but at cell 250 level.

In one embodiment, beam failure detection is performed not at cell 250 level but at TRP 201 level. Since RLF detection at cell 250 level in the existing radio link monitoring can coexist with BFD at TRP 201 level, RLF detection at cell 250 level can be configured for the UE 100. On the other hand, since beam failure detection at cell 250 level in the existing radio link monitoring competes with beam failure detection at TRP 201 level, beam failure detection at cell 250 level cannot be configured for the UE 100.

Figure 17:
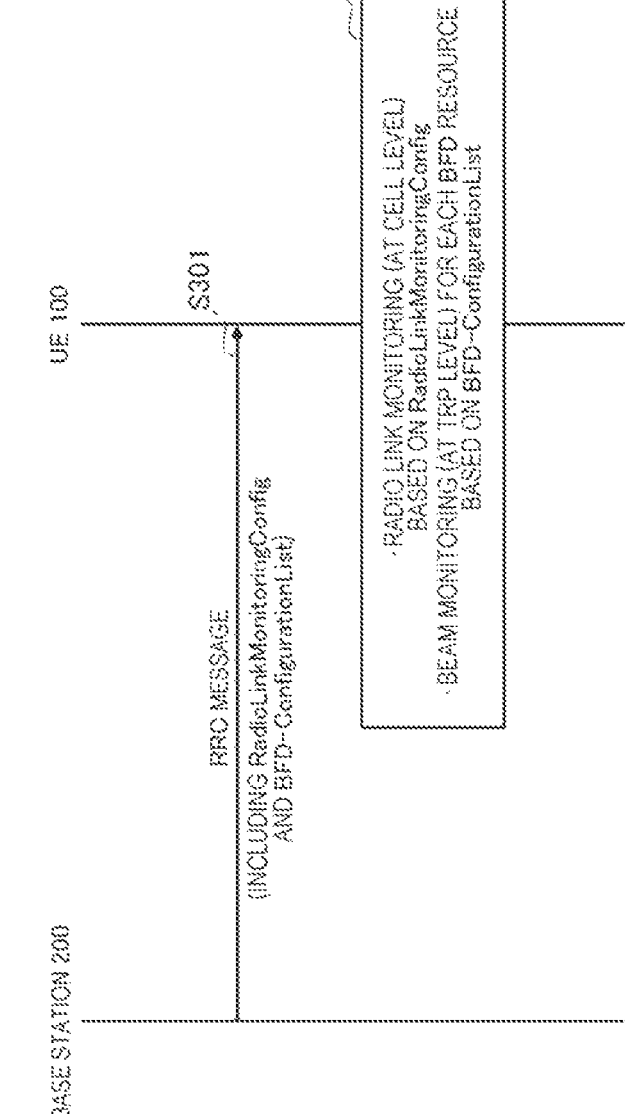
FIG. 17 is a diagram for describing coexistence with existing radio link monitoring according to one embodiment.

As illustrated in FIG. 17, in step S301, the base station 200 (the controller 230) that manages the cell 250 including the N TRPs 201 generates the RRC message including the radio link monitoring configuration (RadioLinkMonitoring-Config) for configuring the radio link monitoring at cell 250 level and the BFD configuration list (BFD-Configuration-List) for configuring N BFD resource sets (BFD Resource Sets). The base station 200 (the communicator 210) transmits the generated RRC message to the UE 100. The UE 100 (communicator 110) receives the RRC message.

In step S302, the UE 100 (the controller 120) performs radio link monitoring for detecting RLF at cell 250 level based on the radio link monitoring configuration (Radio-LinkMonitoringConfig). In addition, the UE 100 (the controller 120) performs beam monitoring for individually detecting beam failure for each of the N BFD resource sets based on the BFD configuration list (BFD-Configuration-List). That is, the UE 100 (the controller 120) performs beam monitoring at TRP 201 level.

When beam failure is detected for any BFD resource set by the beam monitoring based on the BFD configuration list (BFD-ConfigurationList), the UE 100 (the controller 120) executes processing for recovery from the detected beam failure, for example, BFR MAC CE transmission process-ing. In addition, when RLF is detected for the cell 250 by the radio link monitoring based on the radio link monitoring configuration (RadioLinkMonitoringConfig), the UE 100 (the controller 120) performs processing for recovery from the detected RLF, for example, RRC re-establishment pro-cessing. Such two-stage failure detection and recovery can enhance failure resistance of communication.

Figure 18:
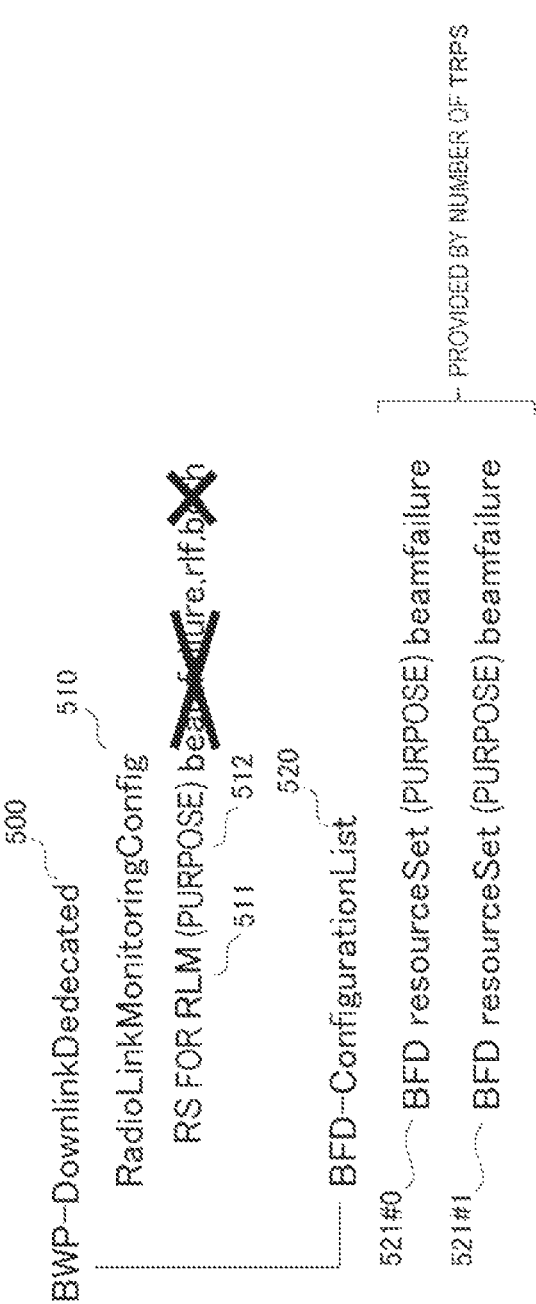
FIG. 18 is a diagram illustrating a configuration example of the RRC message according to one embodiment.

As illustrated in FIGS. 18 and 19, in the RRC message, the radio link monitoring configuration (RadioLinkMonitor-ingConfig) 510 included in the BWP configuration (BWP-DownlinkDedicated) 500 includes, as configuration infor-mation, a reference signal resource (RS for RLM) 511 for radio link monitoring and a purpose 512 of the reference signal resource (RS for RLM) 511. In a case where the UE 100 is configured with the BFD configuration list (BFD- ConfigurationList) 520, the base station 200 (the controller 230) configures detection of RLF (rlf) as the purpose 512 instead of detection of beam failure (beamfailure).

Specifically, in the technical specification, there are three options of "beam failure (beamfailure)", "RLF (rlf)", and "both" as the purpose 512 of the reference signal resource (RS for RLM) 511. However, in a case where the BFD configuration list (BFD-ConfigurationList) 520 is config-ured for the UE 100, a restriction that only RLF (rlf) can be configured as the purpose 512 of the reference signal resource (RS for RLM) 511 is specified. Therefore, in a case where the BFD configuration list (BFD-ConfigurationList) 520 is configured, the UE 100 (the controller 120) detects RLF at cell 250 level without detecting beam failure based on the radio link monitoring configuration (RadioLinkMoni-toringConfig) 510. As a result, the existing radio link moni-toring and beam failure detection at TRP 201 level can appropriately coexist.

Note that, even in a case where the BFD configuration list (BFD-ConfigurationList) 520 is configured, it is also con-ceivable that the base station 200 configures "beam failure (beamfailure)" or "both" as the purpose 512 of the reference signal resource (RS for RLM) 511 due to an unexpected error. Therefore, in a case where the BFD configuration list (BFD-ConfigurationList) 520 is configured, and "beam fail-ure" (beamfailure) or "both" is configured as the purpose 512 of the reference signal resource (RS for RLM) 511, the UE 100 (the controller 120) may read that the purpose 512 of the reference signal resource (RS for RLM) 511 is RLF (rlf).

Beam Failure Detection and Recovery Operation in SpCell

Figure 21:
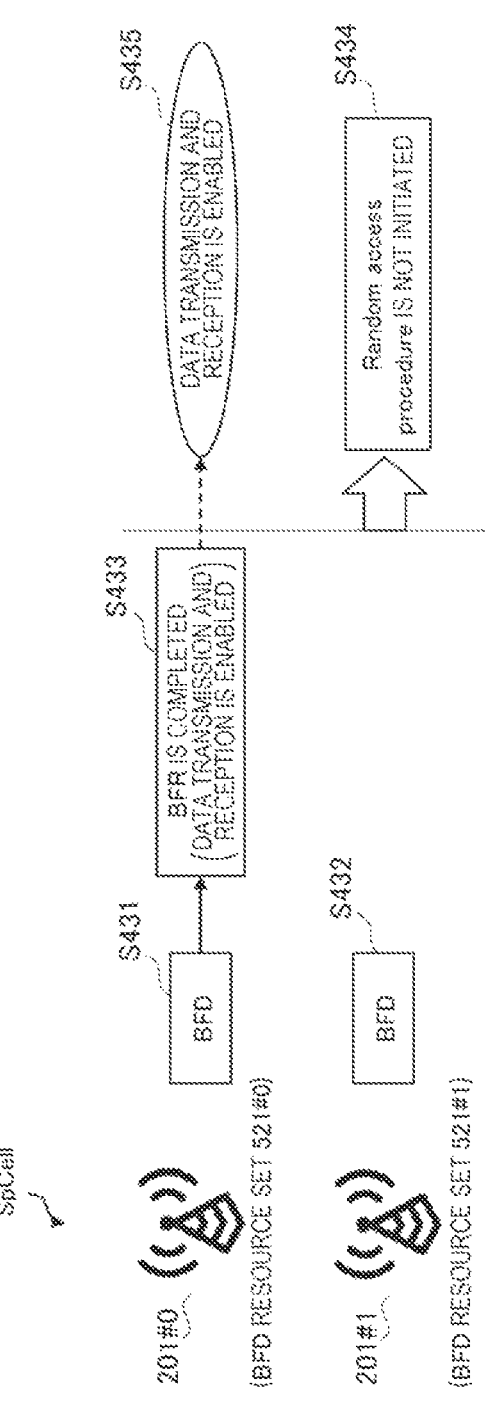
FIG. 21 is a diagram illustrating the BFD/BFR operation in the SpCell according to one embodiment.

Next, a BFD/BFR operation in an SpCell according to one embodiment will be described with reference to FIGS. 20 to 22. Here, it is assumed that the UE 100 performs radio communication with the cell 250 (specifically, SpCell) including two TRPs 201 #0 and 201 #1. However, one cell 250 may include three or more TRPs 201. In addition, it is assumed that the BFD resource set 521 for each TRP 201 has already been configured for the UE 100.

Before describing the BFD/BFR operation in an SpCell according to one embodiment, a comparative example will be described with reference to FIG. 20.

In step S401, the UE 100 (the controller 120) detects beam failure for the BFD resource set 521 #0 associated with the TRP 201 #0 and initiates (triggers) BFR with BFR MAC CE transmission.

In step S402, the UE 100 (the controller 120) detects beam failure for the BFD resource set 521 #1 associated with the TRP 201 #1. In response to beam failure detection for both of the BFD resource sets 521 #0 and 521 #1 (that is, both of the TRPs 201 #0 and 201 #1), the UE 100 (the controller 120) determines to initiate the random access procedure for the cell 250 (SpCell).

In step S403, the UE 100 (the controller 120) successfully completes BFR for the BFD resource set 521 #0 associated with the TRP 201 #0, and becomes possible to transmit and receive data to and from the TRP 201 #0.

In step S404, the UE 100 (the controller 120) initiates the random access procedure for the cell 250 (SpCell). The UE 100 (the controller 120) cannot transmit and receive data to and from the cell 250 (SpCell) during the random access procedure.

In step S405, the UE 100 (the controller 120) cannot perform communication (data transmission/reception) with the cell 250 (SpCell) due to the random access procedure although data transmission/reception with the TRP 201 #0 is possible.

As described above, even in a case where the UE 100 has detected beam failure for the TRPs 201 #0 and 201 #1, when recovery from the beam failure has occurred for the TRP 201 #0, communication with the cell 250 (SpCell) is possible. However, when the random access procedure is initiated (step S404) without considering whether or not recovery from the beam failure has occurred, data transmission/reception cannot be performed during the random access procedure, and thus communication is interrupted.

Therefore, in a case where beam failure has been detected for all of the N BFD resource sets 521 associated with the N TRPs 201, the UE 100 (the controller 120) according to one embodiment determines whether or not to initiate the random access procedure for the cell 250 (SpCell) based on the state of recovery from the beam failure. For example, the UE 100 (the controller 120) initiates the random access procedure for the cell 250 (SpCell) only in a case where beam failure has been detected for one BFD resource set 521 of the N BFD resource sets 521, beam failure has been detected for the other BFD resource sets 521, and recovery from beam failure has not occurred for any BFD resource set 521. As a result, it is possible to prevent a state in which communication with the cell 250 (SpCell) is not possible due to the random access procedure.

BFD/BFR Operation Example 1 in an SpCell according to one embodiment will be described with reference to FIG. 21.

In step S431, the UE 100 (the controller 120) detects beam failure for the BFD resource set 521 #0 associated with the TRP 201 #0 and initiates BFR with BFR MAC CE transmission.

In step S432, the UE 100 (the controller 120) detects beam failure for the BFD resource set 521 #1 associated with the TRP 201 #1.

In step S433, the UE 100 (the controller 120) successfully completes BFR for the BFD resource set 521 #0 associated with the TRP 201 #0, and becomes possible to transmit and receive data to and from the TRP 201 #0.

In step S434, the UE 100 (the controller 120) determines not to initiate the random access procedure for the cell 250 (SpCell) in response to the successful completion of BFR for the BFD resource set 521 #0 associated with the TRP 201 #0.

In step S435, the UE 100 (the controller 120) can perform communication (data transmission/reception) with the cell 250 (SpCell) and performs communication with the cell 250 (SpCell). The UE 100 (the controller 120) may initiate BFR with BFR MAC CE transmission for the BFD resource set 521 #1 associated with the TRP 201 #1.

As such, in one embodiment, the UE 100 (the controller 120) that has detected beam failure for the BFD resource set 521 #1 determines not to initiate the random access procedure for the cell 250 (SpCell) in a case where beam failure has been detected for the BFD resource set 521 #0 and recovery from beam failure has occurred for the BFD resource set 521 #0. As a result, it is possible to prevent a state in which communication with the cell 250 (SpCell) is not possible due to the random access procedure. In addition, the UE 100 (the controller 120) may determine not to initiate the random access procedure for the cell 250 (SpCell) and initiate the BFR procedure (that is, BFR MAC CE transmission processing) for recovery from beam failure for the BFD resource set 521 #1. As a result, it is possible to attempt to recover communication with the TRP 201 #1.

BFD/BFR Operation Example 2 in an SpCell according to one embodiment will be described with reference to FIG. 22.

In step S451, the UE 100 (the controller 120) detects beam failure for the BFD resource set 521 #0 associated with the TRP 201 #0 and initiates BFR with BFR MAC CE transmission.

In step S452, the UE 100 (the controller 120) detects beam failure for the BFD resource set 521 #1 associated with the TRP 201 #1 and initiates BFR with BFR MAC CE transmission.

In step S453, the UE 100 (the controller 120) determines that BFR for the BFD resource set 521 #0 associated with the TRP 201 #0 is not completed (not succeeded).

In step S454, the UE 100 (the controller 120) determines that BFR for the BFD resource set 521 #1 associated with the TRP 201 #1 is not completed (not succeeded).

In step S455, the UE 100 (the controller 120) detects beam failure for all of the N BFD resource sets 521, and initiates the random access procedure for the cell 250 (SpCell) in response to the fact that no recovery for beam failure has occurred for any of the BFD resource sets 521.

Specific Example of Operation of MAC Entity in Communication Apparatus

Next, a specific example of an operation of a MAC entity (that is, an entity of the MAC layer) in the UE 100 according to one embodiment will be described with reference to FIGS. 23 and 24. The operation of the MAC entity may be a part of the operation of the controller 120 of the UE 100. Note that FIGS. 23 and 24 illustrate an operation example in a case described in the technical specification (TS 38.321) of the MAC layer of 3GPP.

As illustrated in FIG. 23, in a case where one or more BFD resource sets (BFD Resource Sets) 521 are configured for each serving cell for which BFD is configured (step S501), the MAC entity performs the operations of steps S502 to S521.

In a case where the beam failure instance indication is received from a lower layer (that is, the physical layer) for the BFD resource set (BFD Resource Set) 521 identified by the BFD resource set identifier (bfd-ResourceSetId) (step S502), the MAC entity performs the operations of steps S503 to S510.

In step S503, the MAC entity starts or restarts the timer (beamFailureDetectionTimerPerRS) configured for the BFD resource set (BFD Resource Set) 521 identified by the BFD resource set identifier (bfd-ResourceSetId).

In step S504, the MAC entity increments a count value (BFI_COUNTER_BFD_RS) configured for the BFD resource set (BFD Resource Set) 521 identified by the BFD resource set identifier (bfd-ResourceSetId), that is, adds "1". An initial value of the count value (BFI_COUNTER_BFD_RS) is "0".

In a case where the count value (BFI_COUNTER_BFD_RS) is greater than or equal to the maximum count value (beamFailureInstanceMaxCountPerRS) configured for the BFD resource set (BFD Resource Set) 521 identified by the BFD resource set identifier (bfd-ResourceSetId), the MAC entity performs the operations of steps S506 to S510.

Here, in a case where the serving cell is an SpCell (step S506), beam failure has been detected with another BFD resource set (BFD Resource Set) 521, and recovery from the beam failure has not yet occurred by the beam recovery procedure (step S507), the MAC entity initiates the random access procedure on the SpCell for beam recovery in step S508.

On the other hand, in a case where the serving cell is not an SpCell or in a case where another BFD resource set (BFD Resource Set) 521 has been recovered by the beam recovery procedure (step S509), the MAC entity triggers BFR for the BFD resource set (BFD Resource Set) 521 in step S510.

The MAC entity sets (resets) the count value (BFI_COUNTER_BFD_RS) to 0 in step S513 in a case where the corresponding timer (beamFailureDetectionTimerPerRS) expires for each BFD resource set (BFD Resource Set) 521 (step S511).

On the other hand, in a case where any one of the timer (beamFailureDetectionTimerPerRS), the maximum count value (beamFailureInstanceMaxCountPerRS), and the reference signal resource used for BFD (reference signal resource used for beam failure detection) associated with the BFD resource set (BFD Resource Set) 521 is reconfigured by an upper layer (that is, the RRC layer) (step S512), the MAC entity sets (resets) the count value (BFI_COUNTER_BFD_RS) to 0 in step S513.

In a case where the serving cell is an SpCell and the random access procedure for BFR of the SpCell is successfully completed (step S514), the MAC entity performs the operations of steps S515 to S517.

In step S515, the MAC entity sets (resets) the count value (BFI_COUNTER_BFD_RS) to 0.

In step S516, the MAC entity stops the timer (beamFailureDetectionTimerPerRS) in a case where the timer (beamFailureDetectionTimerPerRS) is configured.

In step S517, the MAC entity determines that BFR is successfully completed.

On the other hand, in a case where the serving cell is an SCell and a PDCCH addressed to a C-RNTI indicating uplink grant for new transmission has been received for an HARQ process used for transmission of BFR MAC MAC including BFR information of the BFD resource set (BFD Resource Set) 521 (step S518), or in a case where the SCell is deactivated (step S519), the MAC entity performs the operations of steps S520 and S521. The BFR MAC CE includes a normal BFR MAC MAC and a Truncated BFR MAC CE.

In step S520, the MAC entity sets (resets) the count value (BFI_COUNTER_BFD_RS) to 0.

In step S521, the MAC entity determines that BFR is successfully completed and cancels all triggered BFRs for the current BFD resource set (BFD Resource Set) 521.

As illustrated in FIG. 24, in a case where the MAC entity determines, in the BFR procedure, that at least one BFR has been triggered for the SCell or BFD resource set (BFD Resource Set) 521 for which evaluation of candidate beams has been performed in accordance with the requirements specified in TS 38.133 and has not been canceled, the MAC entity performs the operations of steps S532 to S537.

In a case where an uplink shared channel (UL-SCH) resource is available for new transmissions and the UL-SCH resource is capable of accommodating a BFR MAC CE and its subheader as a result of logical channel prioritization (LCP) (step S532), then in step S533, the MAC entity instructs a multiplexing and assembly procedure to generate the BFR MAC CE.

On the other hand, in a case where the UL-SCH resource can be used for new transmission and the UL-SCH resource can accommodate a Truncated BFR MAC CE and its subheader as a result of LCP (step S534), the MAC entity instructs the multiplexing and assembly procedure to generate the Truncated BFR MAC CE in step S535.

On the other hand, in a case where neither of the conditions of steps S532 and S534 is satisfied (step S536), in step S537, the MAC entity performs evaluation on the candidate beams according to the requirements specified in TS 38.133, triggers BFR, and triggers a scheduling request (SR) for BFR of the SCell for each SCell or BFD resource set (BFD Resource Set) 521 that has not been canceled.

The MAC entity cancels all BFRs triggered for the SCell or BFD resource set (BFD Resource Set) 521 in a case where an MAC protocol data unit (PDU) is transmitted and the PDU includes a BFR MAC CE or a Truncated BFR MAC CE including beam failure information for the SCell or BFD resource set (BFD Resource Set) 521 (step S538).

As described above, the communication apparatus 100 that performs radio communication with the base station 200 that manages the cell 250 including N transmission/reception points 201 includes the communicator 110 that receives a message for configuring N BFD resource sets (BFD resource sets) 521 from the base station 200, and the controller 120 that individually detects beam failure for each of the N BFD resource sets (BFD resource sets) 521. The controller 120 triggers BFR for one BFD resource set with which beam failure has been detected. The communicator 110 transmits a BFR MAC CE including information regarding the detected beam failure or an SR for requesting a resource for transmitting the BFR MAC CE. In a case where a MAC protocol data unit (PDU) including the BFR MAC CE is transmitted, the controller 120 cancels all the triggered BFRs for the one BFD resource set. This makes it possible to appropriately perform BFR at TRP 201 level.

In the UE 100, the controller 120 detects beam failure for each of the N BFD resource sets (BFD Resource Sets) 521 in response to notification of a beam failure event from the physical layer in the UE 100 made a specified number of times within a specified time. As described above, each of the N BFD resource sets (BFD Resource Sets) 521 includes information for configuring the timer (beamFailureDetectionTimerPerRS) indicating the specified time and the maximum count value (beamFailureInstanceMaxCountPerRS) indicating the specified number of times independently of the other BFD resource sets.

In the UE 100, in a case where a beam failure event is notified from the physical layer for the one BFD resource set (BFD Resource Set) 521, the controller 120 starts or restarts the timer (beamFailureDetectionTimerPerRS) associated with the one BFD resource set (BFD Resource Set) 521, and increments the count value (BFI_COUNTER_BFD_RS) associated with the one BFD resource set (BFD Resource Set) 521. This makes it possible to appropriately perform BFD at TRP 201 level.

In the UE 100, the controller 120 resets the count value (BFI_COUNTER_BFD_RS) associated with the one BFD resource set (BFD Resource Set) 521 in a case where the timer (beamFailureDetectionTimerPerRS) associated with the one BFD resource set (BFD Resource Set) 521 expires. This makes it possible to appropriately perform BFD at TRP 201 level.

In the UE 100, in a case where any one of the timer (beamFailureDetectionTimerPerRS), the maximum count value (beamFailureInstanceMaxCountPerRS), and the reference signal resource used for BFD (reference signal resource used for beam failure detection) associated with the one BFD resource set (BFD Resource Set) 521 is reconfigured by the base station 200, the controller 120 resets the count value (BFI_COUNTER_BFD_RS) associated with the one BFD resource set (BFD Resource Set) 521. This makes it possible to appropriately perform BFD at TRP 201 level.

In the UE 100, the cell 250 is an SCell, and the communicator 110 receives a PDCCH indicating uplink grant for an HARQ process used for the transmission of the BFR MAC CE for the one BFD resource set (BFD Resource Set) 521 after the transmission of the BFR MAC CE. In response to the reception of the PDCCH, the controller 120 resets the count value (BFI_COUNTER_BFD_RS) associated with the one BFD resource set (BFD Resource Set) 521, considers that BFR has succeeded, and cancels all the triggered BFRs for the one BFD resource set (BFD Resource Set) 521. This makes it possible to appropriately perform BFD at TRP 201 level.

Other Embodiments

The operation sequence (and the operation flow) in the above-described embodiment may not necessarily be executed in time series according to the order described in the flow diagram or the sequence diagram. For example, the steps in the operation may be performed in an order different from the order described as the flow diagram or the sequence diagram, or may be performed in parallel. In addition, some of the steps in the operation may be removed and additional steps may be added to the processing. Furthermore, the operation sequence (and the operation flow) in the above-described embodiment may be performed separately and independently, or may be performed by combining two or more operation sequences (and operation flows). For example, some steps of one operation flow may be added to another operation flow, or some steps of one operation flow may be replaced with some steps of another operation flow.

In the above-described embodiments, the base station 200 may include a plurality of units. The plurality of units may include a first unit that hosts a higher layer (higher layer) included in the protocol stack and a second unit that hosts a lower layer (lower layer) included in the protocol stack. The higher layer may include the RRC layer, the SDAP layer, and the PDCP layer, and the lower layer may include the RLC layer, the MAC layer, and the PHY layer. The first unit may be a CU (central unit), and the second unit may be a DU (Distributed Unit). The plurality of units may include a third unit that performs processing of a lower layer of the PHY layer. The second unit may perform processing of a higher layer of the PHY layer. The third unit may be an RU (Radio Unit). The base station 200 may be one of the plurality of units, and may be connected to another unit of the plurality of units. In addition, the base station 200 may be an IAB (Integrated Access and Backhaul) donor or an IAB node.

In the above-described embodiments, a mobile communication system based on the NR is described as an example of the mobile communication system 1. However, the mobile communication system 1 is not limited to this example. The mobile communication system 1 may be a system conforming to a TS of any of LTE or another generation system (for example, the sixth generation) of the 3GPP standard. The base station 200 may be an eNB that provides evolved universal terrestrial radio access (E-UTRA) user plane and control plane protocol terminations towards the UE 100 in LTE. The mobile communication system 1 may be a system conforming to a TS defined in a standard other than the 3GPP standard.

A program for causing a computer to execute each processing performed by the UE 100 or the base station 200 may be provided. The program may be recorded on a computer readable medium. The program can be installed in the computer by using the computer readable medium. Here, the computer readable medium on which the program is recorded may be a non-transitory recording medium. The non-transitory recording medium is not particularly limited, but may be, for example, a recording medium such as a CD-ROM or a DVD-ROM. In addition, a circuit that executes each processing performed by the UE 100 or the base station 200 may be integrated, and at least a part of the UE 100 or the base station 200 may be configured as a semiconductor integrated circuit (chipset, SoC).

In the above-described embodiment, "transmit (transmit)" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive (receive)" may mean to perform processing of at least one layer in a protocol stack used for reception, or may mean to physically receive a signal wirelessly or by wire. Alternatively, "receive" may mean a combination of performing the processing of at least one layer and physically receiving a signal wirelessly or by wire. Similarly, "acquire (obtain/acquire)" may mean to acquire information from stored information, may mean to acquire information from information received from another node, or may mean to acquire the information by generating information. Similarly, "include (include)" and "comprise (comprise)" do not mean to include only the listed items, but mean that the terms may include only the listed items or may include additional items in addition to the listed items. Similarly, in the present disclosure, "or (or)" does not mean exclusive OR but means OR.

Although the present disclosure has been described in accordance with examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

SUPPLEMENTARY NOTES

Features related to the above-described embodiment are additionally described.

Supplementary Note 1

A communication apparatus (100) that performs radio communication with a base station (200) that manages a cell (250) including N (N≥2) transmission/reception points (201 #0 and 201 #1), the communication apparatus comprising:

a communicator (110) configured to receive a radio resource control (RRC) message from the base station (200), the RRC message including information for configuring N beam failure detection resource sets (521 #0 and 521 #1); and a controller (120) configured to individually detect beam failure for each of the N beam failure detection resource sets (521 #0 and 521 #1), wherein the controller (120) is configured to trigger beam failure recovery (BFR) for one beam failure detection resource set with which the beam failure has been detected, and the controller (120) is configured to cancel all the triggered BFRs for the one beam failure detection resource set in a case where a medium access control (MAC) protocol data unit (PDU) is transmitted, the MAC protocol data unit (PDU) including a BFR MAC control element (CE) including information regarding the detected beam failure.

Supplementary Note 2

The communication apparatus (100) according to supplementary note 1, wherein the communicator (110) is configured to transmit the BFR MAC CE including the information regarding the detected beam failure or a scheduling request for requesting a resource for transmitting the BFR MAC CE.

Supplementary Note 3

The communication apparatus (100) according to supplementary note 1, wherein the controller (120) is configured to detect the beam failure for each of the N beam failure detection resource sets (521 #0 and 521 #1) in response to notification of a beam failure event from a physical layer of the communication apparatus (100) made a specified number of times within a specified time, and each of the N beam failure detection resource sets (521 #0 and 521 #1) includes information for configuring a timer indicating the specified time and a maximum count value indicating the specified number of times independently of other beam failure detection resource sets.

Supplementary Note 4

The communication apparatus (100) according to supplementary note 3, wherein the controller (120) is configured to start or restart the timer associated with the one beam failure detection resource set and increments a count value associated with the one beam failure detection resource set in a case where the beam failure event is notified from the physical layer for the one beam failure detection resource set.

Supplementary Note 5

The communication apparatus (100) according to supplementary note 4, wherein the controller (120) is configured to reset the count value associated with the one beam failure detection resource set in a case where the timer associated with the one beam failure detection resource set expires.

Supplementary Note 6

The communication apparatus (100) according to supplementary note 4 or 5, wherein the controller (120) is configured to reset the count value associated with the one beam failure detection resource set in a case where any one of the timer, the maximum count value, and a reference signal resource used for beam failure detection associated with the one beam failure detection resource set is reconfigured.

Supplementary Note 7

The communication apparatus (100) according to any one of supplementary notes 4 to 6, wherein the cell is a secondary cell, and the communicator (110) is configured to receive a physical downlink control channel (PDCCH) indicating uplink grant for a hybrid automatic repeat request (HARM) process used for the transmission of the BFR MAC CE for the one beam failure detection resource set after the transmission of the BFR MAC CE, and the controller (120) is configured to reset the count value associated with the one beam failure detection resource set in response to the reception of the PDCCH, consider that the BFR has succeeded, and cancel all the triggered BFRs for the one beam failure detection resource set.

Supplementary Note 8

A base station (200) that manages a cell (250) including N (N≥2) transmission/reception points (201 #0 and 201 #1), the base station (200) comprising:

a transmitter (211) configured to transmit, to a communication apparatus (100), a radio resource control (RRC) message including information for configuring N beam failure detection resource sets (521 #0 and 521 #1); and a controller (230) configured to control communication with the communication apparatus (100), wherein each of the N beam failure detection resource sets (521 #0 and 521 #1) is used for individually detecting beam failure in the communication apparatus (100), the controller (230) is configured to control to trigger beam failure recovery (BFR) for one beam failure detection resource set with which the beam failure has been detected, and the controller (230) is configured to control to cancel all the triggered BFRs for the one beam failure detection resource set in a case where a medium access control (MAC) protocol data unit (PDU) is transmitted, the MAC protocol data unit (PDU) including a BFR MAC control element (CE) including information regarding the detected beam failure.

Supplementary Note 9

A communication method executed by a communication apparatus (100) that performs radio communication with a base station (200) that manages a cell (250) including N (N≥2) transmission/reception points (201 #0 and 201 #1), the communication method comprising the steps of:

receiving a radio resource control (RRC) message from the base station (200), the RRC message including information for configuring N beam failure detection resource sets (521 #0 and 521 #1);

individually detecting beam failure for each of the N beam failure detection resource sets (521 #0 and 521 #1);

triggering beam failure recovery (BFR) for one beam failure detection resource set with which the beam failure has been detected; and canceling all the triggered BFRs for the one beam failure detection resource set in a case where a medium access control (MAC) protocol data unit (PDU) is transmitted, the MAC protocol data unit (PDU) including a BFR MAC control element (CE) including information regarding the detected beam failure.

The invention claimed is:

1. A communication apparatus that communicates with a base station that manages a cell including N (N≥2) transmission/reception points, the communication apparatus comprising:

a communicator configured to receive, from the base station, a radio resource control (RRC) message including information for configuring N beam failure detection resource sets; and a controller configured to individually detect beam failure for each of the N beam failure detection resource sets, wherein the controller is configured to trigger beam failure recovery (BFR) for one beam failure detection resource set for which the beam failure has been detected from among the N beam failure detection resource sets, the controller is configured to cancel all the triggered BFRs for the one beam failure detection resource set for which the beam failure has been detected, in a case where a medium access control (MAC) protocol data unit (PDU) is transmitted, the MAC PDU including a BFR MAC control element (CE) which includes information for the detected beam failure, the RRC message includes BWP-DownlinkDedicated which is an information element used for configuring communication apparatus specific parameters of a downlink bandwidth part, and the BWP-DownlinkDedicated includes information for configuring cell level radio link monitoring and the information for configuring the N beam failure detection resource sets.

2. The communication apparatus according to claim 1, wherein the communicator is configured to transmit, to the base station, the BFR MAC CE or a scheduling request used for requesting resources for transmitting the BFR MAC CE.

3. The communication apparatus according to claim 1, wherein the controller is configured to detect the beam failure for each of the N beam failure detection resource sets in response to notification of a beam failure instance indication from a physical layer of the communication apparatus made a specified number of times within a specified time, and each of the N beam failure detection resource sets includes information for configuring a timer indicating the specified time and a maximum count value indicating the specified number of times independently of other beam failure detection resource sets.

4. The communication apparatus according to claim 3, wherein the controller is configured to start or restart the timer associated with the one beam failure detection resource set and increments a count value associated with the one beam failure detection resource set, in a case where the beam failure instance indication is notified from the physical layer for the one beam failure detection resource set.

5. The communication apparatus according to claim 4, wherein the controller is configured to reset the count value associated with the one beam failure detection resource set in a case where the timer associated with the one beam failure detection resource set expires.

6. The communication apparatus according to claim 4, wherein the controller is configured to reset the count value associated with the one beam failure detection resource set in a case where any one of the timer, the maximum count value, and a reference signal resource used for beam failure detection associated with the one beam failure detection resource set is reconfigured.

7. The communication apparatus according to claim 4, wherein the communicator is configured to receive, from the base station, a physical downlink control channel (PDCCH) indicating uplink grant for a hybrid automatic repeat request (HARQ) process used for the transmission of the BFR MAC CE for the one beam failure detection resource set, and the controller is configured to reset the count value associated with the one beam failure detection resource set, consider that the BFR has successfully completed, and cancel all the triggered BFRs for the one beam failure detection resource set.

8. A communication method executed by a communication apparatus that communicates with a base station that manages a cell including N (N≥2) transmission/reception points, the communication method comprising the steps of:

receiving, from the base station, a radio resource control (RRC) message including information for configuring N beam failure detection resource sets;

individually detecting beam failure for each of the N beam failure detection resource sets;

triggering beam failure recovery (BFR) for one beam failure detection resource set for which the beam failure has been detected from among the N beam failure detection resource sets; and canceling all the triggered BFRs for the one beam failure detection resource set for which the beam failure has been detected, in a case where a medium access control (MAC) protocol data unit (PDU) is transmitted, the MAC PDU including a BFR MAC control element (CE) which includes information for the detected beam failure;

wherein:

the RRC message includes BWP-DownlinkDedicated which is an information element used for configuring communication apparatus specific parameters of a downlink bandwidth part; and the BWP-DownlinkDedicated includes information for configuring cell level radio link monitoring and the information for configuring the N beam failure detection resource sets.

9. The communication method according to claim 8, further comprising the step of:

transmitting, to the base station, the BFR MAC CE or a scheduling request used for requesting resources for transmitting the BFR MAC CE.

10. The communication method according to claim 8, further comprising the step of:

receiving, from the base station, a physical downlink control channel (PDCCH) indicating uplink grant for a hybrid automatic repeat request (HARQ) process used for the transmission of the BFR MAC CE for the one beam failure detection resource set, and resetting a count value associated with the one beam failure detection resource set, considering that the BFR has successfully completed, and cancelling all the triggered BFRs for the one beam failure detection resource set.

* * * * *